United States Patent
Lee et al.

(10) Patent No.: US 12,443,009 B2
(45) Date of Patent: Oct. 14, 2025

(54) OPTICAL IMAGING SYSTEM

(71) Applicant: SAMSUNG ELECTRO-MECHANICS CO., LTD., Suwon-si (KR)

(72) Inventors: Ji Su Lee, Suwon-si (KR); Dong Hyuk Jang, Suwon-si (KR); Il Yong Park, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 577 days.

(21) Appl. No.: 17/863,747

(22) Filed: Jul. 13, 2022

(65) Prior Publication Data

US 2023/0168467 A1    Jun. 1, 2023

(30) Foreign Application Priority Data

Nov. 26, 2021 (KR) .................. 10-2021-0165683
Mar. 28, 2022 (KR) .................. 10-2022-0038122

(51) Int. Cl.
*G02B 9/64*    (2006.01)
*G02B 13/18*    (2006.01)

(52) U.S. Cl.
CPC ............ *G02B 9/64* (2013.01); *G02B 13/18* (2013.01)

(58) Field of Classification Search
CPC ...... G02B 9/64; G02B 13/18; G02B 13/0015; G02B 13/0045; G02B 13/06
USPC .......................................... 359/754
See application file for complete search history.

(56) References Cited

U.S. PATENT DOCUMENTS

| | | |
|---|---|---|
| 11,709,339 B2 | 7/2023 | Dong et al. |
| 2017/0045714 A1 | 2/2017 | Huang |
| 2019/0056568 A1 | 2/2019 | Huang |
| 2020/0393648 A1 | 12/2020 | Lin et al. |
| 2021/0055520 A1* | 2/2021 | Yan ............ G02B 13/0045 |
| 2021/0063697 A1* | 3/2021 | Li ............... G02B 9/64 |
| 2021/0157092 A1 | 5/2021 | Chen et al. |

(Continued)

FOREIGN PATENT DOCUMENTS

| | | | |
|---|---|---|---|
| CN | 109343205 A | 2/2019 | |
| CN | 110471168 A * | 11/2019 | ......... G02B 13/0045 |

(Continued)

OTHER PUBLICATIONS

Korean Office Action issued on Jul. 4, 2024, in corresponding Korean Patent Application No. 10-2022-0038122. (7pages in English, 6pages in Korean).

(Continued)

*Primary Examiner* — Stephone B Allen
*Assistant Examiner* — Boutsikaris Leonidas
(74) *Attorney, Agent, or Firm* — NSIP Law

(57) ABSTRACT

An optical imaging system includes a first lens, a second lens, a third lens, a fourth lens, a fifth lens, a sixth lens, a seventh lens, and an eighth lens disposed in order from an object side. The first lens has positive refractive power, and the second lens has negative refractive power. At least three of the first to eighth lenses each has a refractive index of 1.61 or more, and $(TTL/(2 \times IMG\ HT)) \times (TTL/f) < 0.64$ is satisfied, where TTL is a distance from an object-side surface of the first lens to an imaging plane on an optical axis, IMG HT is half a diagonal length of the imaging plane, and f is a total focal length of the first lens to the eighth lens.

16 Claims, 20 Drawing Sheets

(56) References Cited

U.S. PATENT DOCUMENTS

| | | |
|---|---|---|
| 2021/0157104 A1 | 5/2021 | Jung et al. |
| 2021/0181482 A1 | 6/2021 | Wang |
| 2021/0191084 A1 | 6/2021 | Dong et al. |
| 2021/0223515 A1 | 7/2021 | Tseng et al. |
| 2021/0255431 A1 | 8/2021 | Zhang et al. |
| 2021/0271053 A1 | 9/2021 | Hu et al. |
| 2021/0278632 A1 | 9/2021 | Wang et al. |
| 2021/0302697 A1 | 9/2021 | Nitta et al. |
| 2022/0179173 A1 | 6/2022 | Hu et al. |
| 2022/0179174 A1 | 6/2022 | Hu et al. |
| 2022/0382018 A1 | 12/2022 | Yeh et al. |
| 2022/0390712 A1* | 12/2022 | Dai .................. G02B 13/18 |

FOREIGN PATENT DOCUMENTS

| | | |
|---|---|---|
| CN | 111061036 A | 4/2020 |
| CN | 111077640 A | 4/2020 |
| CN | 111208627 A | 5/2020 |
| CN | 113204096 A | 8/2021 |
| CN | 113267879 A | 8/2021 |
| JP | 2021-156966 A | 10/2021 |
| TW | 201706658 A | 2/2017 |
| TW | 202045977 A | 12/2020 |
| TW | I714368 B | 12/2020 |
| TW | I725714 B | 4/2021 |
| TW | 202120996 A | 6/2021 |
| TW | 202125027 A | 7/2021 |
| TW | 202132855 A | 9/2021 |
| TW | I748807 B | 12/2021 |
| TW | 202223469 A | 6/2022 |
| TW | 202244560 A | 11/2022 |

OTHER PUBLICATIONS

Taiwanese Office Action Issued on Nov. 7, 2022, in counterpart Taiwanese Patent Application No. 111126557 (8 Pages in English, 9 Pages in Chinese).

Taiwanese Office Action issued on Nov. 9, 2023, in counterpart Taiwanese Patent Application No. 112120633 (16 pages in English, 14 pages in Chinese).

Taiwanese Office Action issued on Jun. 7, 2024, in counterpart Taiwanese Patent Application No. 113117887 (10 pages in English, 9 pages in Chinese).

Taiwanese Office Action Issued on Mar. 14, 2025, in Counterpart Taiwanese Patent Application No. 113146157 (12 Pages in English, 10 Pages in Chinese).

Taiwanese Office Action Issued on Jul. 2, 2025, in Counterpart Taiwanese Patent Application No. 113146157 (9 Pages in English, 8 Pages in Chinese).

\* cited by examiner

OPTICAL IMAGING SYSTEM

CROSS-REFERENCE TO RELATED APPLICATION(S)

This application claims the benefit under 35 USC 119(a) of Korean Patent Application No. 10-2021-0165683 filed on Nov. 26, 2021, and Korean Patent Application No. 10-2022-0038122 filed on Mar. 28, 2022, in the Korean Intellectual Property Office, the entire disclosures of which are incorporated herein by reference for all purposes.

BACKGROUND

1. Field

The following description relates to an optical imaging system.

2. Description of Related Art

Recent portable terminals include a camera equipped with an optical imaging system and a plurality of lenses to enable video calls and obtain images.

As functions of a camera in a portable terminal gradually increases, so is the demand for a camera in a portable terminal with higher resolution.

Recently, an image sensor with a high pixel count (e.g., 13 million to 100 million pixels, or the like) has been employed in a camera for a portable terminal device to implement clearer image quality.

However, as the size of an image sensor increases, the total length of its optical system may also correspondingly increase, such that the camera may protrude from a portable terminal device, which may be problematic.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, an optical imaging system includes a first lens, a second lens, a third lens, a fourth lens, a fifth lens, a sixth lens, a seventh lens, and an eighth lens disposed in order from an object side. The first lens has positive refractive power, and the second lens has negative refractive power. At least three of the first to eighth lenses each has a refractive index of 1.61 or more, and $(TTL/(2 \times IMG\ HT)) \times (TTL/f) < 0.64$ is satisfied, where TTL is a distance from an object-side surface of the first lens to an imaging plane on an optical axis, IMG HT is half a diagonal length of the imaging plane, and f is a total focal length of the first lens to the eighth lens.

The second lens may have a refractive index of 1.61 or more. Among the at least three lenses having a refractive index of 1.61 or more, an absolute value of a focal length of a second one of the at least three lenses may be the smallest.

In the optical imaging system, any one or any combination of any two or more of $25 < v1-v2 < 40$, $15 < v1-v4 < 40$, and $15 < v1-(v6+v7)/2 < 30$ may be satisfied, where v1 is a first Abbe Number of the first lens, v2 is a second Abbe Number of the second lens, v4 is a fourth Abbe Number of the fourth lens, v6 is a sixth Abbe Number of the sixth lens, and v7 is a seventh Abbe Number of the seventh lens.

In the optical imaging system, $0 < f1/f < 1.4$ may be satisfied, where f1 is the focal length of the first lens.

In the optical imaging system, $-3 < f2/f < 0$ may be satisfied, where f2 is a focal length of the second lens.

In the optical imaging system, $1 < f3/f < 6$ may be satisfied, where f3 is a focal length of the third lens.

In the optical imaging system, $0 < f7/(10 \times f) < 5$ may be satisfied, where f7 is a focal length of the seventh lens.

In the optical imaging system, $-3 < f8/f < 0$ may be satisfied, where f8 is a focal length of the eighth lens.

In the optical imaging system, $BFL/f < 0.3$ may be satisfied, where BFL is a distance from an image-side surface of the eighth lens to the imaging plane on the optical axis.

In the optical imaging system, $70° < FOV \times (IMG\ HT/f) < 100°$ may be satisfied, where FOV is a field of view of the optical imaging system.

In the optical imaging system, $-0.2 < SAG52/TTL < 0$ may be satisfied, where SAG52 is an SAG value on an end of an effective diameter of an image-side surface of the fifth lens.

In the optical imaging system, $-0.2 < SAG62/TTL < 0$ may be satisfied, where SAG62 is an SAG value on an end of an effective diameter of an image-side surface of the sixth lens.

In the optical imaging system, $-0.3 < SAG72/TTL < 0$ may be satisfied, where SAG72 is an SAG value on an end of an effective diameter of an image-side surface of the seventh lens.

In the optical imaging system, $-0.3 < SAG82/TTL < 0$ may be satisfied, where SAG82 is an SAG value on an end of an effective diameter of an image-side surface of the eighth lens.

In the optical imaging system, either one or both of $5 < |Y72/Z72| < 100$ and $5 < |Y82/Z82| < 30$ may be satisfied, where Y72 is a vertical height between the optical axis and a first inflection point of an image-side surface of the seventh lens, Y82 is a vertical height between the optical axis and a first inflection point of an image-side surface of the eighth lens, Z72 is an Sag value at a first inflection point of an image-side surface of the seventh lens, and Z82 is an Sag value at a first inflection point of an image-side surface of the eighth lens.

In the optical imaging system, the third lens has positive refractive power, the fourth lens has positive refractive power, the fifth lens has negative refractive power, the seventh lens has positive refractive power, and the eighth lens has negative refractive power.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
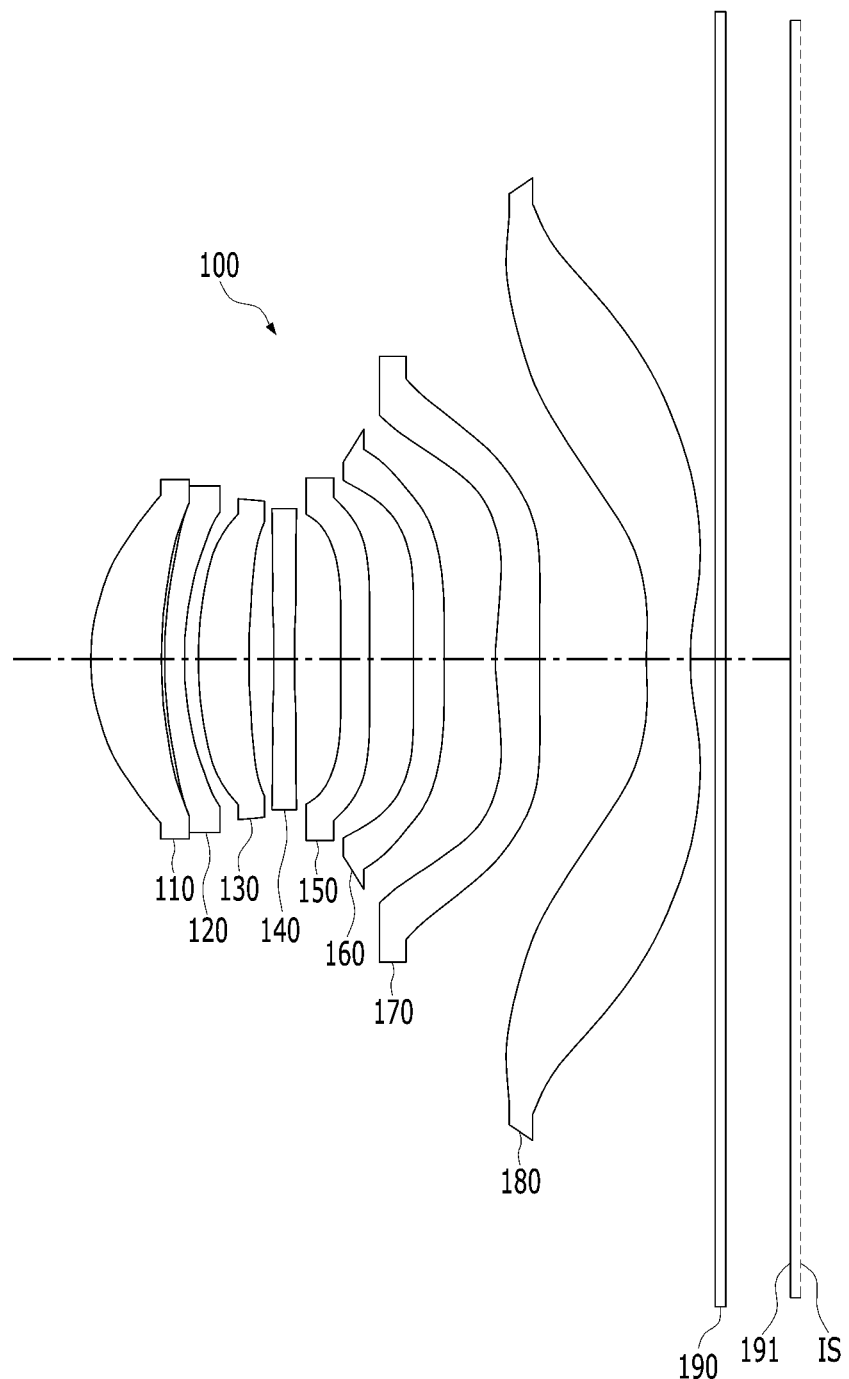
FIG. 1 is a diagram illustrating an optical imaging system according to a first example embodiment of the present disclosure.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The features of the examples described herein may be combined in various ways as will be apparent after an understanding of the disclosure of this application. Further, although the examples described herein have a variety of configurations, other configurations are possible as will be apparent after an understanding of the disclosure of this application.

In the diagrams illustrating the lenses, a thickness, a size, and a shape of the lens are exaggerated to illustrate an example, and a spherical or an aspherical shape of the lens illustrated in the diagram is an example, and a shape is not limited thereto.

The first lens refers to the lens most adjacent to an object side, and the eighth lens refers to the lens most adjacent to an imaging plane (or an image sensor).

Also, in each lens, the first surface refers to a surface adjacent to an object side (or an object-side surface), and the second surface refers to a surface adjacent to an image side (or an image-side surface). Also, in example embodiments, units of numerical values for a radius of curvature, thickness, distance, focal length, or the like of the lens are millimeters, and a unit of a field of view (FOV) is degree.

Also, in the descriptions of the shape of each lens, the notion in which one surface is convex indicates that a paraxial region of the surface is convex, the notion in which one surface is concave indicates that a paraxial region of the surface is concave, and the notion that one surface is planar indicates that a paraxial region of the surface is planar. Therefore, even when it is described that one surface of the lens is convex, an edge portion of the lens may be concave. Similarly, even when it is described that one surface of the lens is concave, an edge portion of the lens may be convex. Also, when it is described that one surface of the lens is planar, an edge portion of the lens may be convex or concave.

The paraxial region refers to a relatively narrow region neighboring to an optical axis.

The imaging plane may refer to a virtual plane on which a focus may be formed by an optical imaging system. Alternatively, the imaging plane may refer to one surface of the image sensor on which light is received.

The optical imaging system in an example embodiment may include eighth lenses.

For example, the optical system in an example embodiment may include a first lens, a second lens, a third lens, a fourth lens, a fifth lens, a sixth lens, a seventh lens, and an eighth lens disposed in order from an object side. The first to eighth lenses may be spaced apart from each other by a predetermined distance along the optical axis.

However, the optical imaging system in an example embodiment may not simply include seven lenses, and may further include other components if desired.

For example, the optical imaging system may further include an image sensor for converting an incident image of a subject into an electrical signal.

Also, the optical imaging system may further include an infrared filter (hereinafter, referred to as a "filter") for blocking infrared rays. The filter may be disposed between the eighth lens and the image sensor.

Also, the optical imaging system may further include a stop for adjusting the amount of light.

The first to eighth lenses included in the optical imaging system in an example embodiment may be formed of a plastic material.

Also, at least one of the first to eighth lenses has an aspherical surface. Also, each of the first to eighth lenses may have at least one aspherical surface.

That is, at least one of the first and second surfaces of the first to eighth lenses may be aspherical. Here, the aspherical surfaces of the first to eighth lenses are represented by Equation 1.

$$Z = \frac{cY^2}{1+\sqrt{1-(1+K)c^2Y^2}} + AY^4 + BY^6 + CY^8 + DY^{10} + EY^{12} + FY^{14} + GY^{16} + HY^{18} + JY^{20} + LY^{22} + MY^{24} + NY^{26} + OY^{28} + PY^{30}$$

[Equation 1]

In Equation 1, c is a radius of curvature of the lens (a reciprocal of a radius of curvature), K is a conic constant, and Y is a distance from one point on the aspherical surface of the lens to the optical axis. Also, constants A to P refer to aspheric coefficients. Z is a distance between one point on the aspherical surface of the lens and an apex of the aspherical surface in an optical axis direction.

The optical imaging system in an example embodiment may satisfy at least one of conditional expressions as below:

| | |
|---|---|
| $0 < f1/f < 1.4$; | [Conditional Expression 1] |
| $25 < v1-v2 < 40$; | [Conditional Expression 2] |
| $15 < v1-v4 < 40$; | [Conditional Expression 3] |
| $15 < v1-(v6+v7)/2 < 30$; | [Conditional Expression 4] |
| $-3 < f2/f < 0$; | [Conditional Expression 5] |
| $1 < f3/f < 6$; | [Conditional Expression 6] |
| $0 < f7/(10 \times f) < 5$; | [Conditional Expression 7] |
| $-3 < f8/f < 0$; | [Conditional Expression 8] |
| $BFL/f < 0.3$; | [Conditional Expression 9] |
| $70° < FOV \times (IMG\ HT/f) < 100°$; | [Conditional Expression 10] |
| $-0.2 < SAG52/TTL < 0$; | [Conditional Expression 11] |
| $-0.2 < SAG62/TTL < 0$; | [Conditional Expression 12] |
| $-0.3 < SAG72/TTL < 0$; | [Conditional Expression 13] |
| $-0.3 < SAG82/TTL < 0$; | [Conditional Expression 14] |
| $5 < IY72/Z721 < 100$; | [Conditional Expression 15] |
| $5 < IY82/Z821 < 30$; and | [Conditional Expression 16] |
| $(TTL/(2 \times IMG\ HT)) \times (TTL/f) < 0.64$. | [Conditional Expression 17] |

In the conditional expressions, f is the total focal length of the optical imaging system, f1 is the focal length of the first lens, f2 is the focal length of the second lens, f3 is the focal length of the third lens, f7 is the focal length of the seventh lens, and f8 is the focal length of the eighth lens.

v1 is the Abbe number of the first lens, v2 is the Abbe number of the second lens, v4 is the Abbe number of the fourth lens, v6 is the Abbe number of the sixth lens, and v7 is the Abbe number of the seventh lens.

TTL is the distance from the object-side surface of the first lens to the imaging plane on an optical axis, and BFL is the distance from the image-side surface of the eighth lens to the imaging plane on an optical axis.

IMG HT is half of the diagonal length of the imaging plane, and FOV is the field of view of the optical imaging system.

SAG52 is the SAG value on an end of the effective diameter of the image-side surface of the fifth lens, SAG62 is the SAG value on an end of the effective diameter of the image-side surface of the sixth lens, SAG72 is the SAG value on an end of the effective diameter of the image-side surface of the seventh lens, and SAG82 is the SAG value on an end of the effective diameter of the image-side surface of the eighth lens.

When the SAG value has a negative value, the configuration indicates that an end of the effective diameter of the corresponding lens surface is disposed more adjacent to the object side than the apex of the corresponding lens surface.

When the SAG value has a positive value, the configuration indicates that an end of the effective diameter of the corresponding lens surface is disposed more adjacent to the image side than the apex of the corresponding lens surface.

Y72 is the vertical height between the optical axis and a first inflection point of the image-side surface of the seventh lens, and Y82 is the vertical height between the optical axis and a first inflection point of the image-side surface of the eighth lens.

Z72 is the Sag value at the first inflection point of the image-side surface of the seventh lens, and Z82 is the Sag value at the first inflection point of the image-side surface of the eighth lens.

First to eighth lenses included in the optical imaging system in an example embodiment will be described.

The first lens may have positive refractive power. Also, the first lens may have a meniscus shape convex toward the object. In greater detail, the first surface of the first lens may be convex, and the second surface of the first lens may be concave.

At least one of the first surface and the second surface of the first lens may be aspherical. For example, both surfaces of the first lens may be aspherical.

The second lens may have negative refractive power. Also, the second lens may have a meniscus shape convex toward the object side. In greater detail, the first surface of the second lens may be convex, and the second surface of the second lens may be concave.

At least one of the first surface and the second surface of the second lens may be aspherical. For example, both surfaces of the second lens may be aspherical.

The third lens may have positive refractive power. Also, the third lens may have a meniscus shape convex toward the object. In greater detail, the first surface of the third lens may be convex, and the second surface of the third lens may be concave.

At least one of the first surface and the second surface of the third lens may be aspherical. For example, both surfaces of the third lens may be aspherical.

The fourth lens may have negative refractive power. Also, the fourth lens may have a meniscus shape convex toward the object side. In greater detail, the first surface of the fourth lens may be convex, and the second surface of the fourth lens may be concave.

Alternatively, both surfaces of the fourth lens may be convex. In greater detail, the first surface and the second surface of the fourth lens may be convex.

At least one of the first surface and the second surface of the fourth lens may be aspherical. For example, both surfaces of the fourth lens may be aspherical.

The fifth lens may have negative refractive power. Also, the fifth lens may have a meniscus shape convex toward the object. In greater detail, the first surface of the fifth lens may be convex in the paraxial region, and the second surface of the fifth lens may be concave in the paraxial region.

Alternatively, the fourth lens may have a meniscus shape convex toward the image side. In greater detail, the first surface of the fourth lens may be concave, and the second surface of the fourth lens may be convex.

At least one of the first surface and the second surface of the fifth lens may be aspherical. For example, both surfaces of the fifth lens may be aspherical.

The sixth lens may have positive refractive power or negative refractive power. Also, the sixth lens may have a meniscus shape convex toward the object side. In greater detail, the first surface of the sixth lens may be convex in the paraxial region, and the second surface of the sixth lens may be concave in the paraxial region.

At least one of the first surface and the second surface of the sixth lens may be aspherical. For example, both surfaces of the sixth lens may be aspherical.

The sixth lens may have at least one inflection point formed on at least one of the first surface and the second surface. For example, the first surface of the sixth lens may be convex in the paraxial region and may be concave in a portion other than the paraxial region. The second surface of the sixth lens may be convex in the paraxial region and may be concave in a portion other than the paraxial region.

The seventh lens may have positive refractive power. Also, the seventh lens may have a meniscus shape convex toward the object side. In greater detail, the first surface of the seventh lens may be convex in the paraxial region, and the second surface of the fourth lens may be concave in the paraxial region.

Both surfaces of the seventh lens may be convex. In greater detail, the first surface and the second surface of the seventh lens may be convex.

At least one of the first surface and the second surface of the seventh lens may be aspherical. For example, both surfaces of the seventh lens may be aspherical.

Also, at least one inflection point may be formed on at least one of the first surface and the second surface of the seventh lens. For example, the first surface of the seventh lens may be concave in the paraxial region and may be convex in a portion other than the paraxial region. The second surface of the seventh lens may be concave in the paraxial region and may be convex in a portion other than the paraxial region.

The eighth lens may have negative refractive power. Also, the eighth lens may have a meniscus shape convex toward the object side. In greater detail, the first surface of the eighth lens may be convex in the paraxial region, and the second surface of the eighth lens may be concave in the paraxial region.

Both surfaces of the eighth lens may be concave. In greater detail, the first surface and the second surface of the eighth lens may be concave.

At least one of the first surface and the second surface of the eighth lens may be aspherical. For example, both surfaces of the eighth lens may be aspherical.

Also, at least one inflection point may be formed on at least one of the first surface and the second surface of the eighth lens. For example, the first surface of the eighth lens may be convex in the paraxial region and may be concave in a portion other than the paraxial region. The second surface of the eighth lens may be concave in the paraxial region and may be convex in a portion other than the paraxial region.

Each of the first to eighth lenses may be formed of a plastic material having optical properties different from those of adjacent lenses.

Meanwhile, at least three lenses among the first to eighth lenses may have a refractive index greater than 1.61. For example, the refractive indexes of the second lens, the fifth lens, and the sixth lens may be greater than 1.61. Also, the refractive indexes of the second lens, the fourth lens, and the sixth lens may be greater than 1.61.

An optical imaging system 100, according to a first example embodiment, will be described with reference to FIGS. 1 and 2.

The optical imaging system 100 in the first example embodiment may include an optical system including a first lens 110, a second lens 120, a third lens 130, a fourth lens 140, and a fifth lens 150, a sixth lens 160, a seventh lens 170, and an eighth lens 180, and may further include a filter 190 and an image sensor IS.

The optical imaging system 100 in the first example embodiment may form a focus on the imaging plane 191. The imaging plane 191 may refer to a surface on which a focus may be formed by the optical imaging system. For example, the imaging plane 191 may refer to one surface of the image sensor IS on which light is received.

The lens characteristics of each lens (a radius of curvature, a thickness of the lens or a distance between the lenses, a refractive index, an Abbe number, and a focal length) are listed in Table 1.

TABLE 1

| Surface No. | Note | Radius of curvature | Thickness or distance | Refractive index | Abbe number | Focal length |
|---|---|---|---|---|---|---|
| S1 | First lens | 2.569 | 0.787 | 1.544 | 56.0 | 7.09 |
| S2 |  | 6.791 | 0.025 |  |  |  |
| S3 | Second lens | 5.789 | 0.220 | 1.680 | 18.2 | −16.44 |
| S4 |  | 3.772 | 0.167 |  |  |  |
| S5 | Third lens | 4.858 | 0.562 | 1.535 | 55.7 | 17.92 |
| S6 |  | 9.410 | 0.251 |  |  |  |
| S7 | Fourth lens | 19.735 | 0.250 | 1.567 | 37.4 | 372.07 |
| S8 |  | 21.657 | 0.512 |  |  |  |
| S9 | Fifth lens | 52.749 | 0.321 | 1.680 | 18.2 | −37.18 |
| S10 |  | 17.204 | 0.487 |  |  |  |
| S11 | Sixth lens | 18.041 | 0.340 | 1.635 | 24.0 | 263.04 |
| S12 |  | 20.054 | 0.580 |  |  |  |
| S13 | Seventh lens | 4.823 | 0.477 | 1.567 | 37.4 | 15.86 |
| S14 |  | 9.955 | 1.202 |  |  |  |
| S15 | Eighth lens | 10.211 | 0.477 | 1.544 | 56.0 | −5.51 |
| S16 |  | 2.285 | 0.302 |  |  |  |
| S17 | Filter | Infinity | 0.110 | 1.517 | 64.2 |  |
| S18 |  | Infinity | 0.770 |  |  |  |
| S19 | Imaging plane | Infinity |  |  |  |  |

The total focal length f of the optical imaging system 100 in the first example embodiment may be 7.46 mm, MG HT may be 7.145 mm, FOV may be 85.4°, SAG52 may be −0.399 mm, SAG62 may be −0.896 mm, SAG72 may be −1.473 mm, and SAG82 may be −1.750 mm.

In the first example embodiment, the first lens 110 may have positive refractive power, the first surface of the first lens 110 may be convex, and the second surface of the first lens 110 may be concave.

The second lens 120 may have negative refractive power, a first surface of the second lens 120 may be convex, and a second surface of the second lens 120 may be concave.

The third lens 130 may have positive refractive power, a first surface of the third lens 130 may be convex, and a second surface of the third lens 130 may be concave.

The fourth lens 140 may have negative refractive power, a first surface of the fourth lens 140 may be convex, and a second surface of the fourth lens 140 may be concave.

The fifth lens 150 may have negative refractive power, the first surface of the fifth lens 150 may be convex, and the second surface of the fifth lens 150 may be concave.

The sixth lens 160 may have positive refractive power, the first surface of the sixth lens 160 may be convex in the paraxial region, and the second surface of the sixth lens 160 may be concave in the paraxial region.

Also, at least one inflection point may be formed on at least one of the first and second surfaces of the sixth lens 160. For example, the first surface of the sixth lens 160 may be convex in the paraxial region and may be concave in a portion other than the paraxial region. Also, the second surface of the sixth lens 160 may be convex in the paraxial region and may be concave in a portion other than the paraxial region.

The seventh lens 170 may have positive refractive power, the first surface of the seventh lens 170 may be convex, and the second surface of the seventh lens 170 may be concave.

Also, at least one inflection point may be formed on at least one of the first and second surfaces of the seventh lens 170. For example, the first surface of the seventh lens 170 may be convex in the paraxial region and may be concave in a portion other than the paraxial region. Also, the second surface of the seventh lens 170 may be concave in the paraxial region and may be convex in a portion other than the paraxial region.

The eighth lens 180 may have negative refractive power, the first surface of the eighth lens 180 may be convex in the paraxial region, and the second surface of the eighth lens 180 may be concave in the paraxial region.

Also, at least one inflection point may be formed on at least one of the first and second surfaces of the eighth lens 180. For example, the first surface of the eighth lens 180 may be convex in the paraxial region and may be concave in a portion other than the paraxial region. Also, the second surface of the eighth lens 180 may be concave in the paraxial region and may be convex in a portion other than the paraxial region.

Each surface of the first lens 110 to the seventh lens 170 may have an aspherical coefficient as in Table 2. For example, both the object-side surface and the image-side surface of the first lens 110 to the eighth lens 180 may be aspherical.

TABLE 2

|  | S1 | S2 | S3 | S4 | S5 | S6 | S7 | S8 |
|---|---|---|---|---|---|---|---|---|
| Conic constant (K) | −1.385 | 10.590 | −10.876 | −4.272 | 0.417 | −8.163 | −57.077 | −51.784 |
| 4th coefficient (A) | 5.851E−02 | 6.883E−02 | 2.584E−02 | 1.172E−02 | −2.280E−02 | −2.888E−02 | −1.086E−02 | −2.414E−02 |
| 6th coefficient (B) | −4.243E−01 | −5.432E−01 | −1.737E−01 | 7.702E−02 | 2.323E−01 | 1.083E−01 | −7.230E−02 | −1.928E−01 |
| 8th coefficient (C) | 1.643E+00 | 1.898E+00 | 5.327E−01 | −6.617E−01 | −1.154E+00 | −3.260E−01 | 3.430E−01 | 1.770E+00 |
| 10th coefficient (D) | −3.720E+00 | −3.851E+00 | −8.263E−01 | 2.233E+00 | 3.293E+00 | 6.649E−01 | −1.036E+00 | −7.188E+00 |
| 12th coefficient (E) | 5.475E+00 | 5.052E+00 | 6.181E−01 | −4.462E+00 | −6.055E+00 | −9.328E−01 | 2.180E+00 | 1.752E+01 |
| 14th coefficient (F) | −5.538E+00 | −4.560E+00 | −2.351E−02 | 5.896E+00 | 7.634E+00 | 9.292E−01 | −3.240E+00 | −2.821E+01 |
| 16th coefficient (G) | 3.976E+00 | 2.935E+00 | −3.984E−01 | −5.410E+00 | −6.818E+00 | −6.622E−01 | 3.460E+00 | 3.148E+01 |
| 18th coefficient (H) | −2.058E+00 | −1.371E+00 | 4.106E−01 | 3.531E+00 | 4.387E+00 | 3.327E−01 | −2.682E+00 | −2.491E+01 |
| 20th coefficient (J) | 7.709E−01 | 4.676E−01 | −2.266E−01 | −1.652E+00 | −2.041E+00 | −1.116E−01 | 1.510E+00 | 1.408E+01 |
| 22nd coefficient (L) | −2.071E−01 | −1.155E−01 | 7.958E−02 | 5.503E−01 | 6.806E−01 | 2.091E−02 | −6.119E−01 | −5.650E+00 |
| 24th coefficient (M) | 3.888E−02 | 2.015E−02 | −1.833E−02 | −1.275E−01 | −1.585E−01 | −1.730E−04 | 1.737E−01 | 1.570E+00 |
| 26th coefficient (N) | −4.844E−03 | −2.363E−03 | 2.692E−03 | 1.952E−02 | 2.448E−02 | −9.184E−04 | −3.281E−02 | −2.873E−01 |
| 28th coefficient (O) | 3.598E−04 | 1.677E−04 | −2.294E−04 | −1.775E−03 | −2.252E−03 | 1.998E−04 | 3.700E−03 | 3.107E−02 |
| 30th coefficient (P) | −1.205E−05 | −5.468E−06 | 8.647E−06 | 7.263E−05 | 9.335E−05 | −1.461E−05 | −1.884E−04 | −1.504E−03 |

|  | S9 | S10 | S11 | S12 | S13 | S14 | S15 | S16 |
|---|---|---|---|---|---|---|---|---|
| Conic constant (K) | 99.000 | −16.070 | −99.000 | −27.356 | 1.180 | −1.687 | 0.203 | −13.875 |
| 4th coefficient (A) | −8.324E−02 | −7.458E−02 | −6.552E−02 | −7.397E−02 | −6.641E−02 | −3.768E−02 | −1.600E−01 | −6.932E−02 |
| 6th coefficient (B) | 5.047E−01 | 2.371E−01 | 1.110E−01 | 5.267E−02 | 1.657E−02 | 1.836E−03 | 7.913E−02 | 2.770E−02 |
| 8th coefficient (C) | −2.750E+00 | −8.973E−01 | −2.847E−01 | −2.526E−02 | 1.451E−02 | 1.443E−02 | −2.862E−02 | −7.877E−03 |
| 10th coefficient (D) | 9.016E+00 | 2.213E+00 | 5.482E−01 | −2.997E−02 | −4.215E−02 | −2.062E−02 | 7.391E−03 | 1.611E−03 |
| 12th coefficient (E) | −1.939E+01 | −3.671E+00 | −7.581E−01 | 7.328E−02 | 4.336E−02 | 1.482E−02 | −1.343E−03 | −2.376E−04 |
| 14th coefficient (F) | 2.880E+01 | 4.237E+00 | 7.525E−01 | −7.312E−02 | −2.656E−02 | −6.730E−03 | 1.739E−04 | 2.524E−05 |
| 16th coefficient (G) | −3.040E+01 | −3.478E+00 | −5.394E−01 | 4.478E−02 | 1.084E−02 | 2.088E−03 | −1.631E−05 | −1.919E−06 |
| 18th coefficient (H) | 2.315E+01 | 2.055E+00 | 2.798E−01 | −1.846E−02 | −3.072E−03 | −4.572E−04 | 1.117E−06 | 1.022E−07 |
| 20th coefficient (J) | −1.277E+01 | −8.751E−01 | −1.047E−01 | 5.285E−03 | 6.125E−04 | 7.134E−05 | −5.586E−08 | −3.629E−09 |

TABLE 2-continued

| | | | | | | | | |
|---|---|---|---|---|---|---|---|---|
| 22nd coefficient (L) | 5.050E+00 | 2.658E−01 | 2.786E−02 | −1.054E−03 | −8.557E−05 | −7.876E−06 | 2.016E−09 | 7.485E−11 |
| 24th coefficient (M) | −1.396E+00 | −5.608E−02 | −5.131E−03 | 1.436E−04 | 8.188E−06 | 5.999E−07 | −5.111E−11 | −3.939E−13 |
| 26th coefficient (N) | 2.562E−01 | 7.805E−03 | 6.201E−04 | −1.276E−05 | −5.106E−07 | −2.995E−08 | 8.631E−13 | −2.003E−14 |
| 28th coefficient (O) | −2.804E−02 | −6.434E−04 | −4.415E−05 | 6.656E−07 | 1.869E−08 | 8.811E−10 | −8.717E−15 | 4.816E−16 |
| 30th coefficient (P) | 1.385E−03 | 2.377E−05 | 1.401E−06 | −1.546E−08 | −3.043E−10 | −1.156E−11 | 3.982E−17 | −3.499E−18 |

Figure 2:
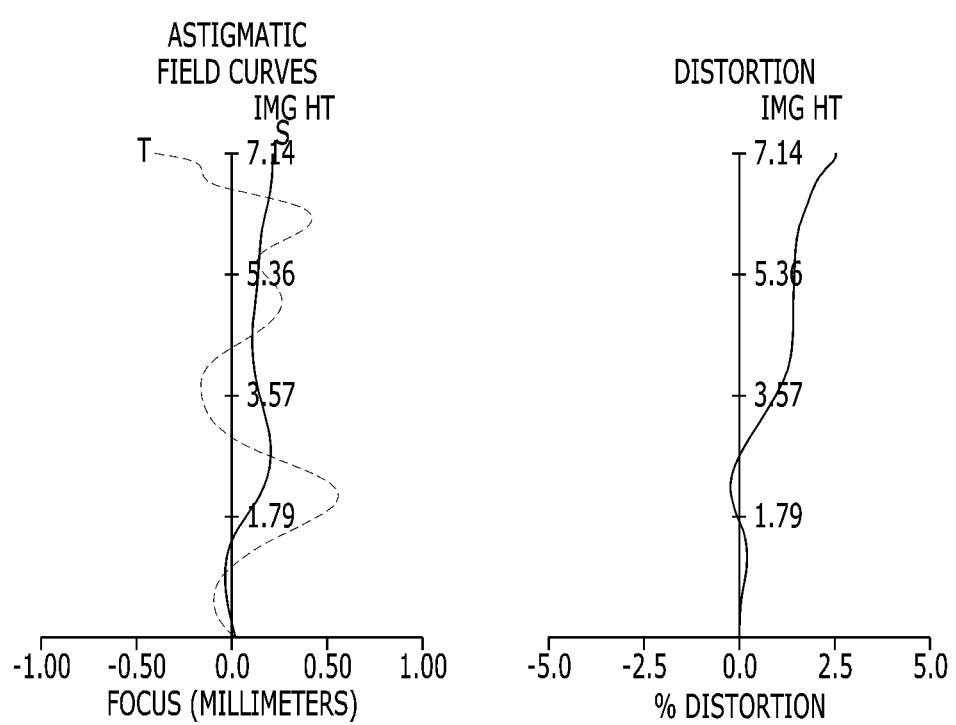
FIG. 2 is curves indicating aberration properties of the optical imaging system illustrated in FIG. 1.

Also, the optical imaging system configured as described above may have the aberration characteristics illustrated in FIG. 2.

Figure 3:
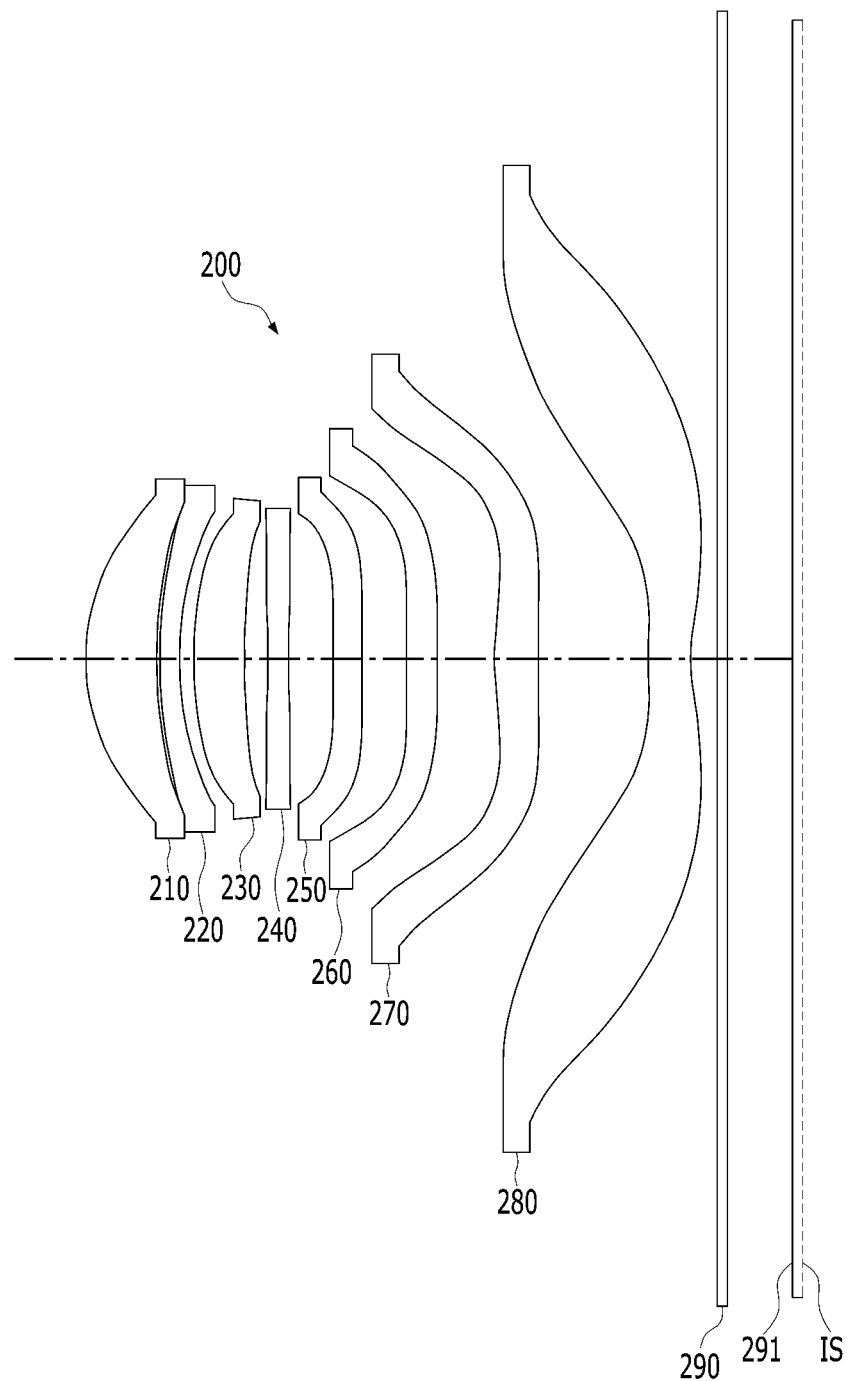
FIG. 3 is a diagram illustrating an optical imaging system according to a second example embodiment of the present disclosure.

An optical imaging system 200, according to a second example embodiment, will be described with reference to FIGS. 3 and 4.

The optical imaging system 200 in the second example embodiment may include an optical system including a first lens 210, a second lens 220, a third lens 230, a fourth lens 240, and a fifth lens 250, a sixth lens 260, a seventh lens 270, and an eighth lens 280 and may further include a filter 290 and an image sensor IS.

The optical imaging system 200 in the second example embodiment may form a focus on the imaging plane 291. The imaging plane 291 may refer to a surface on which a focus may be formed by the optical imaging system. For example, the imaging plane 291 may refer to one surface of the image sensor IS on which light is received.

The lens characteristics of each lens (a radius of curvature, a thickness of the lens or a distance between the lenses, a refractive index, an Abbe number, and a focal length) are listed in Table 3.

TABLE 3

| Surface No. | Note | Radius of curvature | Thickness or distance | Refractive index | Abbe number | Focal length |
|---|---|---|---|---|---|---|
| S1 | First lens | 2.565 | 0.780 | 1.544 | 56.0 | 7.1 |
| S2 | | 6.769 | 0.025 | | | |
| S3 | Second lens | 5.379 | 0.220 | 1.680 | 18.2 | −17.64 |
| S4 | | 3.667 | 0.165 | | | |
| S5 | Third lens | 4.913 | 0.556 | 1.535 | 55.7 | 18.01 |
| S6 | | 9.586 | 0.253 | | | |
| S7 | Fourth lens | 23.383 | 0.250 | 1.567 | 37.4 | 439.35 |
| S8 | | 25.688 | 0.499 | | | |
| S9 | Fifth lens | 82.493 | 0.324 | 1.680 | 18.2 | −27.31 |
| S10 | | 15.298 | 0.473 | | | |
| S11 | Sixth lens | 16.814 | 0.340 | 1.635 | 24.0 | 122.74 |
| S12 | | 21.214 | 0.617 | | | |
| S13 | Seventh lens | 4.800 | 0.492 | 1.567 | 37.4 | 16.07 |
| S14 | | 9.698 | 1.166 | | | |
| S15 | Eighth lens | 10.313 | 0.501 | 1.544 | 56.0 | −5.8 |
| S16 | | 2.383 | 0.299 | | | |
| S17 | Filter | Infinity | 0.110 | 1.517 | 64.2 | |
| S18 | | Infinity | 0.770 | | | |
| S19 | Imaging plane | Infinity | | | | |

The total focal length f of the optical imaging system 200 in the second example embodiment may be 7.43 mm, MG HT may be 7.145 mm, FOV may be 85.6°, SAG52 may be −0.464 mm, SAG62 may be −0.936 mm, SAG72 may be −1.547 mm, and SAG82 may be −1.750 mm.

In the second example embodiment, the first lens 210 may have positive refractive power, the first surface of the first lens 210 may be convex, and the second surface of the first lens 210 may be concave.

The second lens 220 may have negative refractive power, a first surface of the second lens 220 may be convex, and a second surface of the second lens 220 may be concave.

The third lens 230 may have positive refractive power, a first surface of the third lens 230 may be convex, and a second surface of the third lens 230 may be concave.

The fourth lens 240 may have negative refractive power, a first surface of the fourth lens 240 may be convex, and a second surface of the fourth lens 240 may be concave.

The fifth lens 250 may have negative refractive power, the first surface of the fifth lens 250 may be convex, and the second surface of the fifth lens 250 may be concave.

The sixth lens 260 may have positive refractive power, the first surface of the sixth lens 260 may be convex in the paraxial region, and the second surface of the sixth lens 260 may be concave in the paraxial region.

Also, at least one inflection point may be formed on at least one of the first and second surfaces of the sixth lens 260. For example, the first surface of the sixth lens 260 may be convex in the paraxial region and may be concave in a portion other than the paraxial region. Also, the second surface of the sixth lens 260 may be concave in the paraxial region and may be convex in a portion other than the paraxial region.

The seventh lens 270 may have positive refractive power, the first surface of the seventh lens 270 may be convex, and the second surface of the seventh lens 270 may be concave.

Also, at least one inflection point may be formed on at least one of the first and second surfaces of the seventh lens 270. For example, the first surface of the seventh lens 270 may be convex in the paraxial region and may be concave in a portion other than the paraxial region. Also, the second surface of the seventh lens 270 may be concave in the paraxial region and may be convex in a portion other than the paraxial region.

The eighth lens 280 may have negative refractive power, the first surface of the eighth lens 280 may be convex in the paraxial region, and the second surface of the eighth lens 280 may be concave in the paraxial region.

Also, at least one inflection point may be formed on at least one of the first and second surfaces of the eighth lens 280. For example, the first surface of the eighth lens 280 may be convex in the paraxial region and may be concave in a portion other than the paraxial region. Also, the second surface of the eighth lens 280 may be concave in the paraxial region and may be convex in a portion other than the paraxial region.

Each surface of the first lens 210 to the eighth lens 280 may have an aspherical coefficient as in Table 4. For example, both the object-side surface and the image-side surface of the first lens 210 to the eighth lens 280 may be aspherical.

TABLE 4

| | S1 | S2 | S3 | S4 | S5 | S6 | S7 | S8 |
|---|---|---|---|---|---|---|---|---|
| Conic constant (K) | −1.387 | 10.587 | −11.112 | −4.254 | 0.417 | −8.321 | −31.832 | −99.000 |
| 4th coefficient (A) | 4.221E−02 | 6.594E−02 | 6.826E−03 | 1.747E−02 | −2.503E−02 | −3.581E−02 | −7.228E−03 | −5.515E−02 |
| 6th coefficient (B) | −2.770E−01 | −5.057E−01 | −1.251E−01 | −1.310E−01 | 1.612E−01 | 1.952E−01 | −8.709E−02 | 2.588E−01 |
| 8th coefficient (C) | 1.039E+00 | 1.828E+00 | 5.442E−01 | 4.690E−01 | −6.958E−01 | −7.817E−01 | 3.711E−01 | −1.014E+00 |
| 10th coefficient (D) | −2.281E+00 | −3.983E+00 | −1.174E+00 | −8.960E−01 | 1.961E+00 | 2.064E+00 | −1.071E+00 | 2.600E+00 |
| 12th coefficient (E) | 3.262E+00 | 5.793E+00 | 1.589E+00 | 1.006E+00 | −3.690E+00 | −3.726E+00 | 2.213E+00 | −4.609E+00 |
| 14th coefficient (F) | −3.219E+00 | −5.949E+00 | −1.503E+00 | −6.391E−01 | 4.818E+00 | 4.766E+00 | −3.272E+00 | 5.964E+00 |
| 16th coefficient (G) | 2.262E+00 | 4.438E+00 | 1.049E+00 | 1.338E−01 | −4.478E+00 | −4.410E+00 | 3.493E+00 | −5.830E+00 |
| 18th coefficient (H) | −1.151E+00 | −2.434E+00 | −5.524E−01 | 1.352E−01 | 3.006E+00 | 2.976E+00 | −2.712E+00 | 4.373E+00 |
| 20th coefficient (J) | 4.253E−01 | 9.794E−01 | 2.197E−01 | −1.451E−01 | −1.461E+00 | −1.463E+00 | 1.532E+00 | −2.508E+00 |
| 22nd coefficient (L) | −1.131E−01 | −2.855E−01 | −6.475E−02 | 7.051E−02 | 5.093E−01 | 5.167E−01 | −6.230E−01 | 1.077E+00 |
| 24th coefficient (M) | 2.107E−02 | 5.856E−02 | 1.364E−02 | −2.064E−02 | −1.241E−01 | −1.273E−01 | 1.776E−01 | −3.329E−01 |
| 26th coefficient (N) | −2.613E−03 | −8.004E−03 | −1.933E−03 | 3.731E−03 | 2.006E−02 | 2.072E−02 | −3.370E−02 | 6.960E−02 |
| 28th coefficient (O) | 1.937E−04 | 6.538E−04 | 1.643E−04 | −3.854E−04 | −1.932E−03 | −1.993E−03 | 3.820E−03 | −8.764E−03 |
| 30th coefficient (P) | −6.492E−06 | −2.412E−05 | −6.304E−06 | 1.750E−05 | 8.386E−05 | 8.551E−05 | −1.957E−04 | 5.003E−04 |

| | S9 | S10 | S11 | S12 | S13 | S14 | S15 | S16 |
|---|---|---|---|---|---|---|---|---|
| Conic constant (K) | 99.000 | −31.896 | −99.000 | −5.551 | 1.139 | −1.563 | −0.003 | −12.855 |
| 4th coefficient (A) | −3.267E−02 | −1.244E−01 | −8.547E−02 | −7.443E−02 | −8.655E−02 | −4.982E−02 | −1.641E−01 | −8.139E−02 |

TABLE 4-continued

| | | | | | | | | |
|---|---|---|---|---|---|---|---|---|
| 6th coefficient (B) | 2.705E−02 | 5.244E−01 | 2.460E−01 | 2.695E−02 | 7.363E−02 | 1.835E−02 | 9.402E−02 | 4.215E−02 |
| 8th coefficient (C) | −4.764E−01 | −1.825E+00 | −7.978E−01 | 7.136E−02 | −8.519E−02 | 1.658E−03 | −3.756E−02 | −1.426E−02 |
| 10th coefficient (D) | 2.468E+00 | 4.099E+00 | 1.730E+00 | −1.951E−01 | 7.239E−02 | −1.274E−02 | 1.004E−02 | 3.212E−03 |
| 12th coefficient (E) | −6.969E+00 | −6.245E+00 | −2.507E+00 | 2.455E−01 | −4.400E−02 | 1.081E−02 | −1.825E−03 | −5.005E−04 |
| 14th coefficient (F) | 1.250E+01 | 6.688E+00 | 2.502E+00 | −1.938E−01 | 1.898E−02 | −5.178E−03 | 2.328E−04 | 5.545E−05 |
| 16th coefficient (G) | −1.521E+01 | −5.147E+00 | −1.764E+00 | 1.041E−01 | −5.825E−03 | 1.649E−03 | −2.138E−05 | −4.430E−06 |
| 18th coefficient (H) | 1.296E+01 | 2.876E+00 | 8.907E−01 | −3.934E−02 | 1.276E−03 | −3.679E−04 | 1.430E−06 | 2.559E−07 |
| 20th coefficient (J) | −7.832E+00 | −1.168E+00 | −3.230E−01 | 1.058E−02 | −1.995E−04 | 5.833E−05 | −6.986E−08 | −1.059E−08 |
| 22nd coefficient (L) | 3.345E+00 | 3.403E−01 | 8.332E−02 | −2.011E−03 | 2.207E−05 | −6.539E−06 | 2.465E−09 | 3.062E−10 |
| 24th coefficient (M) | −9.880E−01 | −6.930E−02 | −1.490E−02 | 2.641E−04 | −1.692E−06 | 5.059E−07 | −6.121E−11 | −5.914E−12 |
| 26th coefficient (N) | 1.920E−01 | 9.352E−03 | 1.754E−03 | −2.277E−05 | 8.575E−08 | −2.566E−08 | 1.014E−12 | 6.980E−14 |
| 28th coefficient (O) | −2.209E−02 | −7.506E−04 | −1.221E−04 | 1.159E−06 | −2.592E−09 | 7.671E−10 | −1.007E−14 | −4.138E−16 |
| 30th coefficient (P) | 1.140E−03 | 2.710E−05 | 3.799E−06 | −2.638E−08 | 3.550E−11 | −1.023E−11 | 4.530E−17 | 6.262E−19 |

Figure 4:
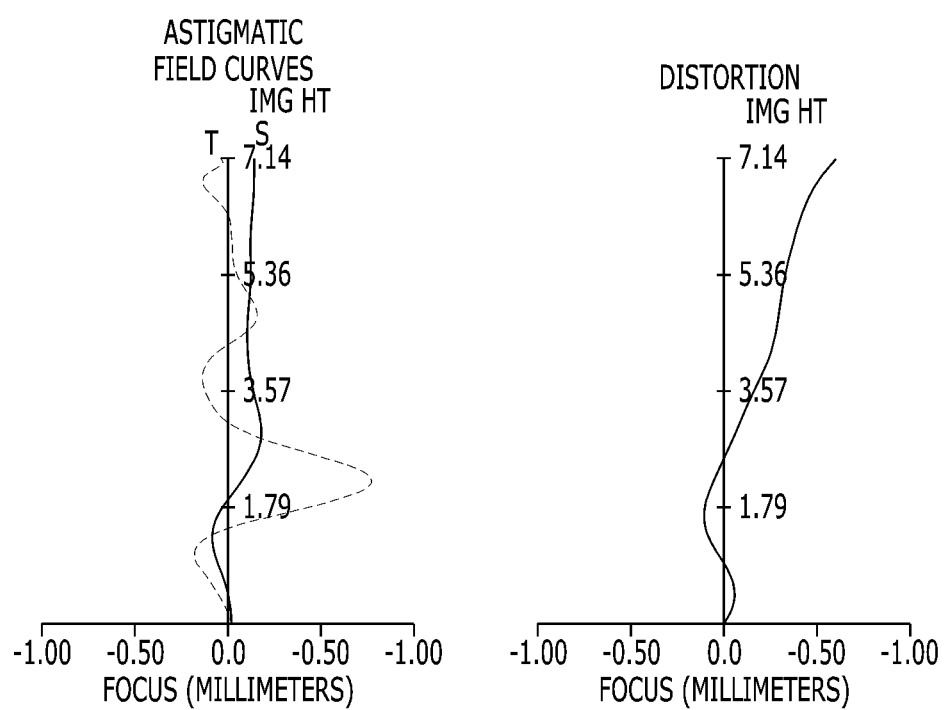
FIG. 4 is curves indicating aberration properties of the optical imaging system illustrated in FIG. 3.

Also, the optical imaging system configured as described above may have the aberration characteristics illustrated in FIG. 4.

Figure 5:
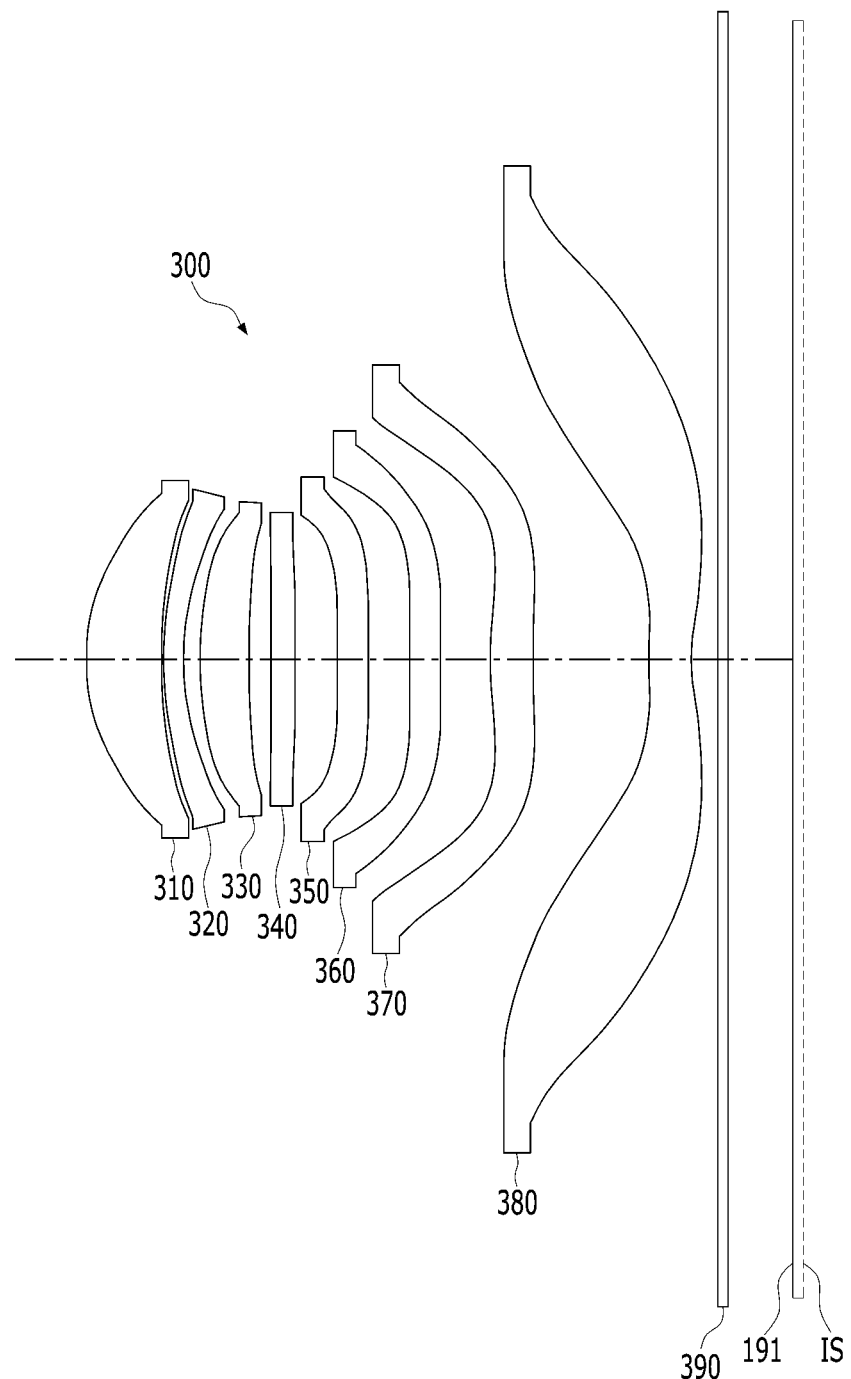
FIG. 5 is a diagram illustrating an optical imaging system according to a third example embodiment of the present disclosure.

An optical imaging system 300, according to a third example embodiment, will be described with reference to FIGS. 5 and 6.

The optical imaging system 300 in the third example embodiment may include an optical system including a first lens 310, a second lens 320, a third lens 330, a fourth lens 340, and a fifth lens 350, a sixth lens 360, a seventh lens 370, and an eighth lens 380 and may further include a filter 390 and an image sensor IS.

The optical imaging system 300 in the third example embodiment may form a focus on the imaging plane 391. The imaging plane 391 may refer to a surface on which a focus may be formed by the optical imaging system. For example, the imaging plane 391 may refer to one surface of the image sensor IS on which light is received.

The lens characteristics of each lens (a radius of curvature, a thickness of the lens or a distance between the lenses, a refractive index, an Abbe number, and a focal length) are listed in Table 5.

TABLE 5

| Surface No. | Note | Radius of curvature | Thickness or distance | Refractive index | Abbe number | Focal length |
|---|---|---|---|---|---|---|
| S1 | First lens | 2.566 | 0.827 | 1.544 | 56.0 | 7.07 |
| S2 | | 6.783 | 0.025 | | | |
| S3 | Second lens | 4.797 | 0.220 | 1.680 | 18.2 | −15.68 |
| S4 | | 3.260 | 0.186 | | | |
| S5 | Third lens | 5.257 | 0.538 | 1.535 | 55.7 | 17.12 |
| S6 | | 11.835 | 0.248 | | | |
| S7 | Fourth lens | 36.796 | 0.250 | 1.567 | 37.4 | 182.29 |
| S8 | | 56.791 | 0.478 | | | |
| S9 | Fifth lens | 204.930 | 0.336 | 1.680 | 18.2 | −38.42 |
| S10 | | 23.431 | 0.460 | | | |
| S11 | Sixth lens | 21.471 | 0.340 | 1.635 | 24.0 | −648.94 |
| S12 | | 20.291 | 0.552 | | | |

TABLE 5-continued

| Surface No. | Note | Radius of curvature | Thickness or distance | Refractive index | Abbe number | Focal length |
|---|---|---|---|---|---|---|
| S13 | Seventh lens | 4.816 | 0.467 | 1.567 | 37.4 | 15.1 |
| S14 | | 10.530 | 1.276 | | | |
| S15 | Eighth lens | 10.655 | 0.525 | 1.544 | 56.0 | −5.19 |
| S16 | | 2.201 | 0.231 | | | |
| S17 | Filter | Infinity | 0.110 | 1.517 | 64.2 | |
| S18 | | Infinity | 0.770 | | | |
| S19 | Imaging plane | Infinity | | | | |

The total focal length f of the optical imaging system 300 in the third example embodiment may be 7.41 mm, MG HT may be 7.145 mm, FOV may be 85.8°, SAG52 may be −0.484 mm, SAG62 may be −0.925 mm, SAG72 may be −1.469 mm, and SAG82 may be −1.839 mm.

In the third example embodiment, the first lens 310 may have positive refractive power, the first surface of the first lens 310 may be convex, and the second surface of the first lens 310 may be concave.

The second lens 320 may have negative refractive power, a first surface of the second lens 320 may be convex, and a second surface of the second lens 320 may be concave.

The third lens 330 may have positive refractive power, a first surface of the third lens 330 may be convex, and a second surface of the third lens 330 may be concave.

The fourth lens 340 may have positive refractive power, a first surface of the fourth lens 340 may be convex, and a second surface of the fourth lens 340 may be concave.

The fifth lens 350 may have negative refractive power, the first surface of the fifth lens 350 may be convex, and the second surface of the fifth lens 350 may be concave.

The sixth lens 360 may have negative refractive power, the first surface of the sixth lens 360 may be convex, and the second surface of the sixth lens 360 may be concave in the paraxial region.

Also, at least one inflection point may be formed on at least one of the first and second surfaces of the sixth lens 360. For example, the first surface of the sixth lens 360 may be convex in the paraxial region and may be concave in a portion other than the paraxial region. Also, the second surface of the sixth lens 360 may be concave in the paraxial region and may be convex in a portion other than the paraxial region.

The seventh lens 370 may have positive refractive power, the first surface of the seventh lens 370 may be convex, and the second surface of the seventh lens 370 may be concave.

Also, at least one inflection point may be formed on at least one of the first and second surfaces of the seventh lens 370. For example, the first surface of the seventh lens 370 may be convex in the paraxial region and may be concave in a portion other than the paraxial region. Also, the second surface of the seventh lens 370 may be concave in the paraxial region and may be convex in a portion other than the paraxial region.

The eighth lens 380 may have negative refractive power, the first surface of the eighth lens 380 may be convex, and the second surface of the eighth lens 380 may be concave.

Also, at least one inflection point may be formed on at least one of the first and second surfaces of the eighth lens 380. For example, the first surface of the eighth lens 380 may be convex in the paraxial region and may be concave in a portion other than the paraxial region. Also, the second surface of the eighth lens 380 may be concave in the paraxial region and may be convex in a portion other than the paraxial region.

Each surface of the first lens 310 to the eighth lens 380 may have an aspherical coefficient as in Table 6. For example, both the object-side surface and the image-side surface of the first lens 310 to the eighth lens 380 may be aspherical.

TABLE 6

| | S1 | S2 | S3 | S4 | S5 | S6 | S7 | S8 |
|---|---|---|---|---|---|---|---|---|
| Conic constant(K) | −1.288 | 10.570 | −11.037 | −4.305 | 0.405 | −7.916 | 58.220 | 23.748 |
| 4th coefficient(A) | 9.266E−03 | 5.296E−03 | 3.368E−03 | −2.282E−03 | −3.014E−03 | −1.278E−02 | −1.360E−02 | −2.612E−02 |
| 6th coefficient(B) | −4.772E−03 | −1.532E−02 | 1.487E−02 | 1.331E−02 | −4.251E−03 | 2.758E−02 | −6.621E−02 | 6.579E−02 |
| 8th coefficient(C) | 1.890E−02 | 1.848E−02 | −7.623E−02 | −1.948E−02 | 5.253E−02 | −7.613E−02 | 3.454E−01 | −2.855E−01 |
| 10th coefficient(D) | −4.189E−02 | −1.988E−02 | 1.975E−01 | −5.069E−03 | −2.155E−01 | 1.219E−01 | −1.069E+00 | 8.597E−01 |
| 12th coefficient(E) | 5.915E−02 | 1.869E−02 | −3.290E−01 | 1.076E−01 | 5.646E−01 | −4.919E−02 | 2.247E+00 | −1.767E+00 |
| 14th coefficient(F) | −5.666E−02 | −1.933E−02 | 3.747E−01 | −2.644E−01 | −9.771E−01 | −1.831E−01 | −3.327E+00 | 2.582E+00 |
| 16th coefficient(G) | 3.807E−02 | 2.133E−02 | −3.001E−01 | 3.604E−01 | 1.159E+00 | 4.231E−01 | 3.546E+00 | −2.742E+00 |
| 18th coefficient(H) | −1.823E−02 | −1.869E−02 | 1.717E−01 | −3.191E−01 | −9.649E−01 | −4.757E−01 | −2.753E+00 | 2.140E+00 |
| 20th coefficient(J) | 6.231E−03 | 1.133E−02 | −7.039E−02 | 1.929E−01 | 5.685E−01 | 3.380E−01 | 1.557E+00 | −1.228E+00 |

TABLE 6-continued

| | | | | | | | | |
|---|---|---|---|---|---|---|---|---|
| 22nd coefficient(L) | −1.503E−03 | −4.608E−03 | 2.053E−02 | −8.054E−02 | −2.360E−01 | −1.607E−01 | −6.348E−01 | 5.125E−01 |
| 24th coefficient(M) | 2.480E−04 | 1.234E−03 | −4.162E−03 | 2.287E−02 | 6.752E−02 | 5.126E−02 | 1.816E−01 | −1.514E−01 |
| 26th coefficient(N) | −2.639E−05 | −2.088E−04 | 5.583E−04 | −4.222E−03 | −1.267E−02 | −1.055E−02 | −3.461E−02 | 3.003E−02 |
| 28th coefficient(O) | 1.604E−06 | 2.024E−05 | −4.465E−05 | 4.568E−04 | 1.404E−03 | 1.267E−03 | 3.942E−03 | −3.591E−03 |
| 30th coefficient(P) | −4.107E−08 | −8.560E−07 | 1.618E−06 | −2.199E−05 | −6.962E−05 | −6.752E−05 | −2.030E−04 | 1.958E−04 |

| | S9 | S10 | S11 | S12 | S13 | S14 | S15 | S16 |
|---|---|---|---|---|---|---|---|---|
| Conic constant(K) | −69.025 | 0.219 | −89.401 | −39.771 | 1.178 | 0.458 | 0.022 | −10.273 |
| 4th coefficient(A) | −6.178E−02 | −5.557E−02 | −6.206E−02 | −7.707E−02 | −7.109E−02 | −4.085E−02 | −1.352E−01 | −5.964E−02 |
| 6th coefficient(B) | 2.122E−01 | 1.125E−01 | 6.254E−02 | 5.434E−02 | 3.190E−02 | 1.083E−02 | 5.645E−02 | 2.059E−02 |
| 8th coefficient(C) | −1.071E+00 | −3.704E−01 | −7.415E−02 | −2.560E−02 | −2.461E−02 | −8.717E−04 | −1.761E−02 | −5.002E−03 |
| 10th coefficient(D) | 3.521E+00 | 8.331E−01 | 5.546E−02 | −1.515E−02 | 1.376E−02 | −5.097E−03 | 4.068E−03 | 8.245E−04 |
| 12th coefficient(E) | −7.822E+00 | −1.291E+00 | −9.287E−03 | 4.049E−02 | −4.741E−03 | 5.044E−03 | −6.787E−04 | −8.827E−05 |
| 14th coefficient(F) | 1.212E+01 | 1.406E+00 | −3.470E−02 | −3.909E−02 | 4.823E−04 | −2.661E−03 | 8.232E−05 | 5.412E−06 |
| 16th coefficient(G) | −1.340E+01 | −1.096E+00 | 4.757E−02 | 2.330E−02 | 3.777E−04 | 9.144E−04 | −7.342E−06 | −5.944E−08 |
| 18th coefficient(H) | 1.070E+01 | 6.174E−01 | −3.398E−02 | −9.434E−03 | −2.165E−04 | −2.167E−04 | 4.841E−07 | −2.138E−08 |
| 20th coefficient(J) | −6.177E+00 | −2.513E−01 | 1.575E−02 | 2.672E−03 | 5.912E−05 | 3.614E−05 | −2.352E−08 | 2.165E−09 |
| 22nd coefficient(L) | 2.553E+00 | 7.306E−02 | −4.976E−03 | −5.297E−04 | −9.983E−06 | −4.234E−06 | 8.303E−10 | −1.132E−10 |
| 24th coefficient(M) | −7.364E−01 | −1.478E−02 | 1.068E−03 | 7.204E−05 | 1.089E−06 | 3.410E−07 | −2.070E−11 | 3.676E−12 |
| 26th coefficient(N) | 1.407E−01 | 1.972E−03 | −1.495E−04 | −6.398E−06 | −7.510E−08 | −1.797E−08 | 3.449E−13 | −7.447E−14 |
| 28th coefficient(O) | −1.599E−02 | −1.558E−04 | 1.233E−05 | 3.340E−07 | 2.983E−09 | 5.577E−10 | −3.446E−15 | 8.657E−16 |
| 30th coefficient(P) | 8.187E−04 | 5.511E−06 | −4.536E−07 | −7.772E−09 | −5.216E−11 | −7.719E−12 | 1.560E−17 | −4.419E−18 |

Figure 6:
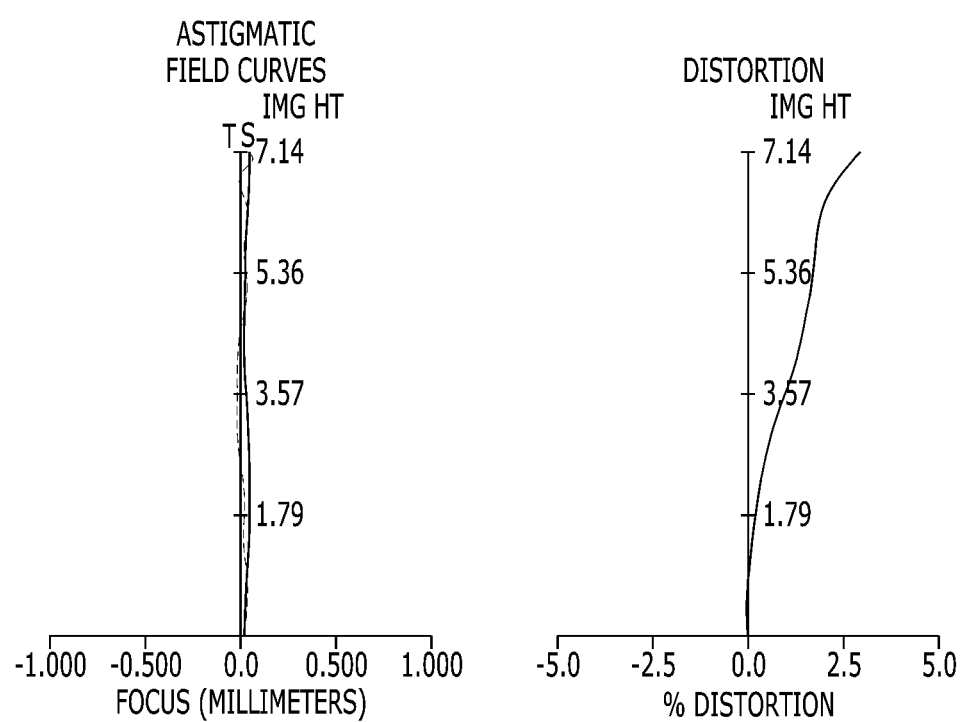
FIG. 6 is curves indicating aberration properties of the optical imaging system illustrated in FIG. 5.

Also, the optical imaging system configured as described above may have the aberration characteristics illustrated in FIG. 6.

Figure 7:
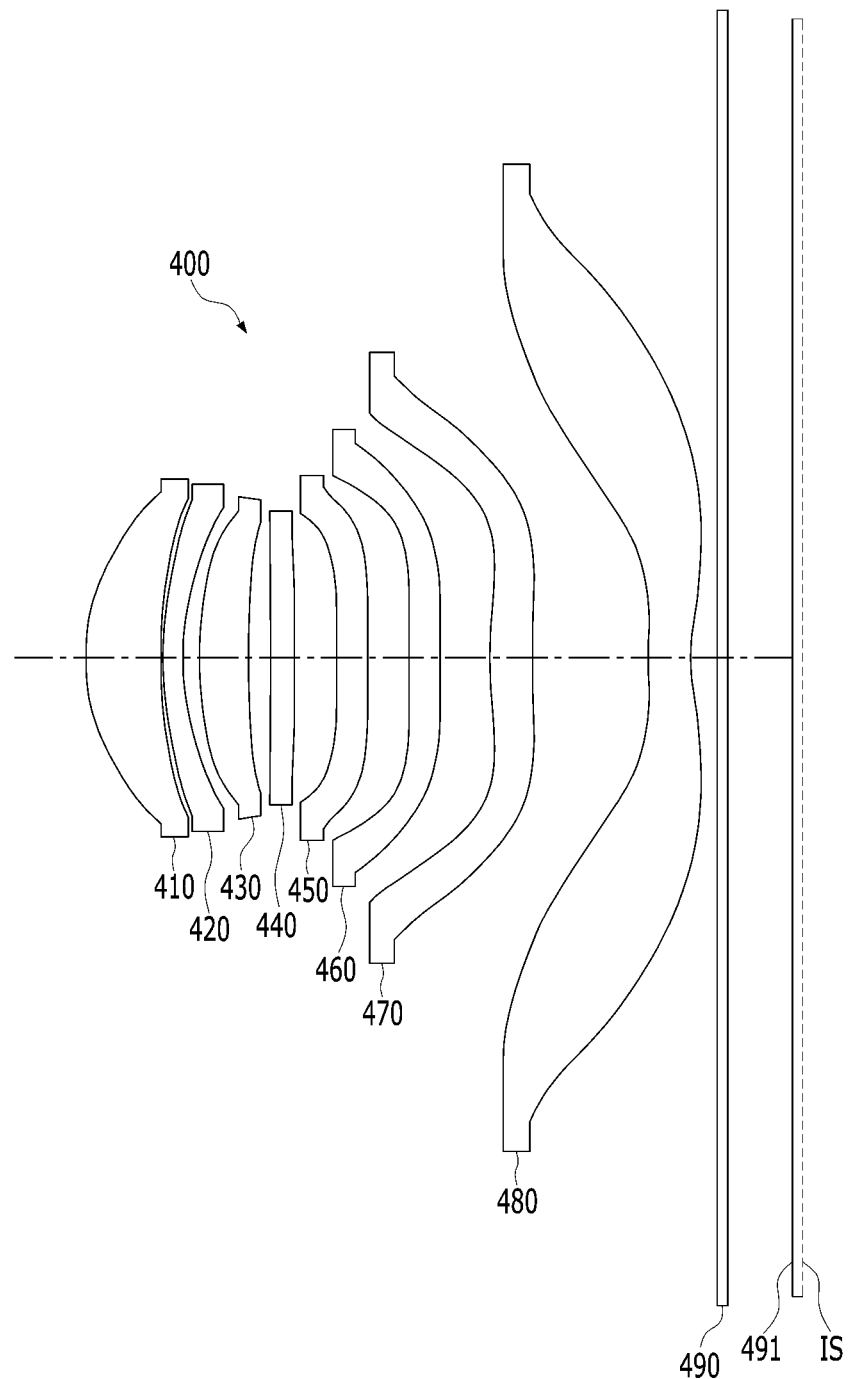
FIG. 7 is a diagram illustrating an optical imaging system according to a fourth example embodiment of the present disclosure.

An optical imaging system 400, according to a fourth example embodiment, will be described with reference to FIGS. 7 and 8.

The optical imaging system 400 in the fourth example embodiment may include an optical system including a first lens 410, a second lens 420, a third lens 430, a fourth lens 440, a fifth lens 450, a sixth lens 460, a seventh lens 470, and an eighth lens 480 and may further include a filter 490 and an image sensor IS.

The optical imaging system 400 in the fourth example embodiment may form a focus on the imaging plane 491. The imaging plane 491 may refer to a surface on which a focus may be formed by the optical imaging system. For example, the imaging plane 491 may refer to one surface of the image sensor IS on which light is received.

The lens characteristics of each lens (a radius of curvature, a thickness of the lens or a distance between the lenses, a refractive index, an Abbe number, and a focal length) are listed in Table 7.

TABLE 7

| Surface No. | Note | Radius of curvature | Thickness or distance | Refractive index | Abbe number | Focal length |
|---|---|---|---|---|---|---|
| S1 | First lens | 2.566 | 0.819 | 1.544 | 56.0 | 7.07 |
| S2 | | 6.782 | 0.025 | | | |
| S3 | Second lens | 4.841 | 0.220 | 1.680 | 18.2 | −15.65 |
| S4 | | 3.279 | 0.189 | | | |
| S5 | Third lens | 5.265 | 0.533 | 1.535 | 55.7 | 17.19 |
| S6 | | 11.819 | 0.248 | | | |
| S7 | Fourth lens | 38.407 | 0.250 | 1.567 | 37.4 | 174.08 |
| S8 | | 62.461 | 0.474 | | | |
| S9 | Fifth lens | 190.903 | 0.341 | 1.680 | 18.2 | −39.17 |
| S10 | | 23.634 | 0.457 | | | |
| S11 | Sixth lens | 21.495 | 0.340 | 1.635 | 24.0 | −500.09 |

TABLE 7-continued

| Surface No. | Note | Radius of curvature | Thickness or distance | Refractive index | Abbe number | Focal length |
|---|---|---|---|---|---|---|
| S12 | | 20.020 | 0.553 | | | |
| S13 | Seventh lens | 4.815 | 0.474 | 1.567 | 37.4 | 15.07 |
| S14 | | 10.552 | 1.281 | | | |
| S15 | Eighth lens | 10.678 | 0.525 | 1.544 | 56.0 | −5.42 |
| S16 | | 2.276 | 0.229 | | | |
| S17 | Filter | Infinity | 0.110 | 1.517 | 64.2 | |
| S18 | | Infinity | 0.770 | | | |
| S19 | Imaging plane | Infinity | | | | |

The total focal length f of the optical imaging system 400 in the fourth example embodiment may be 7.35 mm, MG HT may be 7.145 mm, FOV may be 86.2°, SAG52 may be −0.488 mm, SAG62 may be −0.927 mm, SAG72 may be −1.477 mm, and SAG82 may be −1.850 mm.

In the fourth example embodiment, the first lens 410 may have positive refractive power, the first surface of the first lens 410 may be convex, and the second surface of the first lens 410 may be concave.

The second lens 420 may have negative refractive power, a first surface of the second lens 420 may be convex, and a second surface of the second lens 420 may be concave.

The third lens 430 may have positive refractive power, a first surface of the third lens 430 may be convex, and a second surface of the third lens 430 may be concave.

The fourth lens 440 may have negative refractive power, a first surface of the fourth lens 440 may be convex, and a second surface of the fourth lens 440 may be concave.

The fifth lens 450 may have negative refractive power, the first surface of the fifth lens 450 may be convex, and the second surface of the fifth lens 450 may be concave.

The sixth lens 460 may have negative refractive power, the first surface of the sixth lens 460 may be convex in the paraxial region, and the second surface of the sixth lens 460 may be concave in the paraxial region.

Also, at least one inflection point may be formed on at least one of the first and second surfaces of the sixth lens 460. For example, the first surface of the sixth lens 460 may be convex in the paraxial region and may be concave in a portion other than the paraxial region. Also, the second surface of the sixth lens 460 may be concave in the paraxial region and may be convex in a portion other than the paraxial region.

The seventh lens 470 may have positive refractive power, the first surface of the seventh lens 470 may be convex, and the second surface of the seventh lens 470 may be concave.

Also, at least one inflection point may be formed on at least one of the first and second surfaces of the seventh lens 470. For example, the first surface of the seventh lens 470 may be convex in the paraxial region and may be concave in a portion other than the paraxial region. The second surface of the seventh lens 470 may be concave in the paraxial region and may be convex in a portion other than the paraxial region.

The eighth lens 480 may have negative refractive power, the first surface of the eighth lens 480 may be convex in the paraxial region, and the second surface of the eighth lens 480 may be concave in the paraxial region.

Also, at least one inflection point may be formed on at least one of the first and second surfaces of the eighth lens 480. For example, the first surface of the eighth lens 480 may be convex in the paraxial region and may be concave in a portion other than the paraxial region. The second surface of the eighth lens 480 may be concave in the paraxial region and may be convex in a portion other than the paraxial region.

Each surface of the first lens 410 to the eighth lens 480 may have an aspherical coefficient as in Table 8. For example, both the object-side surface and the image-side surface of the first lens 410 to the eighth lens 480 may be aspherical.

TABLE 8

| | S1 | S2 | S3 | S4 | S5 | S6 | S7 | S8 |
|---|---|---|---|---|---|---|---|---|
| Conic constant(K) | −1.291 | 10.572 | −11.034 | −4.308 | 0.413 | −8.205 | 61.581 | 3.924 |
| 4th coefficient(A) | 8.795E−03 | 5.771E−03 | 5.234E−03 | −2.066E−03 | −3.813E−03 | −1.312E−02 | −1.364E−02 | −2.560E−02 |
| 6th coefficient(B) | −1.274E−04 | −1.771E−02 | 1.639E−03 | 9.401E−03 | 1.552E−03 | 3.161E−02 | −6.659E−02 | 6.573E−02 |
| 8th coefficient(C) | −3.352E−04 | 2.394E−02 | −3.705E−02 | −1.264E−02 | 1.389E−02 | −9.871E−02 | 3.489E−01 | −3.041E−01 |
| 10th coefficient(D) | 4.128E−03 | −2.743E−02 | 1.336E−01 | 1.732E−02 | −5.926E−02 | 1.982E−01 | −1.084E+00 | 9.592E−01 |
| 12th coefficient(E) | −1.147E−02 | 2.775E−02 | −2.674E−01 | −5.686E−03 | 1.797E−01 | −2.202E−01 | 2.288E+00 | −2.034E+00 |
| 14th coefficient(F) | 1.695E−02 | −3.155E−02 | 3.420E−01 | −3.818E−02 | −3.581E−01 | 8.357E−02 | −3.401E+00 | 3.024E+00 |
| 16th coefficient(G) | −1.587E−02 | 3.621E−02 | −2.964E−01 | 8.952E−02 | 4.778E−01 | 1.257E−01 | 3.642E+00 | −3.228E+00 |
| 18th coefficient(H) | 1.009E−02 | −3.183E−02 | 1.793E−01 | −1.035E−01 | −4.372E−01 | −2.354E−01 | −2.840E+00 | 2.504E+00 |
| 20th coefficient(J) | −4.479E−03 | 1.927E−02 | −7.664E−02 | 7.461E−02 | 2.784E−01 | 1.973E−01 | 1.615E+00 | −1.415E+00 |

TABLE 8-continued

| | | | | | | | | |
|---|---|---|---|---|---|---|---|---|
| 22nd coefficient(L) | 1.396E−03 | −7.857E−03 | 2.306E−02 | −3.546E−02 | −1.233E−01 | −1.017E−01 | −6.621E−01 | 5.763E−01 |
| 24th coefficient(M) | −2.996E−04 | 2.120E−03 | −4.782E−03 | 1.115E−02 | 3.724E−02 | 3.400E−02 | 1.907E−01 | −1.651E−01 |
| 26th coefficient(N) | 4.225E−05 | −3.630E−04 | 6.515E−04 | −2.236E−03 | −7.325E−03 | −7.206E−03 | −3.657E−02 | 3.161E−02 |
| 28th coefficient(O) | −3.526E−06 | 3.574E−05 | −5.256E−05 | 2.592E−04 | 8.457E−04 | 8.831E−04 | 4.196E−03 | −3.636E−03 |
| 30th coefficient(P) | 1.320E−07 | −1.541E−06 | 1.907E−06 | −1.323E−05 | −4.351E−05 | −4.771E−05 | −2.178E−04 | 1.904E−04 |

| | S9 | S10 | S11 | S12 | S13 | S14 | S15 | S16 |
|---|---|---|---|---|---|---|---|---|
| Conic constant(K) | 99.000 | −1.999 | −88.686 | −43.159 | 1.176 | 0.330 | −0.054 | −10.582 |
| 4th coefficient(A) | −6.001E−02 | −5.664E−02 | −6.090E−02 | −7.805E−02 | −6.886E−02 | −4.072E−02 | −1.342E−01 | −6.145E−02 |
| 6th coefficient(B) | 1.966E−01 | 1.184E−01 | 5.342E−02 | 5.856E−02 | 2.108E−02 | 7.607E−03 | 5.571E−02 | 2.260E−02 |
| 8th coefficient(C) | −1.004E+00 | −3.892E−01 | −4.242E−02 | −3.305E−02 | −3.590E−03 | 4.796E−03 | −1.735E−02 | −6.075E−03 |
| 10th coefficient(D) | 3.349E+00 | 8.705E−01 | −7.074E−03 | −7.269E−03 | −8.798E−03 | −1.005E−02 | 4.013E−03 | 1.166E−03 |
| 12th coefficient(E) | −7.521E+00 | −1.340E+00 | 6.855E−02 | 3.478E−02 | 1.054E−02 | 7.698E−03 | −6.718E−04 | −1.588E−04 |
| 14th coefficient(F) | 1.175E+01 | 1.451E+00 | −9.999E−02 | −3.604E−02 | −6.495E−03 | −3.607E−03 | 8.183E−05 | 1.539E−05 |
| 16th coefficient(G) | −1.307E+01 | −1.125E+00 | 8.587E−02 | 2.205E−02 | 2.604E−03 | 1.148E−03 | −7.332E−06 | −1.056E−06 |
| 18th coefficient(H) | 1.047E+01 | 6.303E−01 | −5.000E−02 | −9.044E−03 | −7.221E−04 | −2.574E−04 | 4.859E−07 | 5.012E−08 |
| 20th coefficient(J) | −6.063E+00 | −2.553E−01 | 2.054E−02 | 2.578E−03 | 1.412E−04 | 4.118E−05 | −2.373E−08 | −1.529E−09 |
| 22nd coefficient(L) | 2.511E+00 | 7.394E−02 | −5.989E−03 | −5.129E−04 | −1.942E−05 | −4.673E−06 | 8.423E−10 | 2.294E−11 |
| 24th coefficient(M) | −7.250E−01 | −1.490E−02 | 1.215E−03 | 6.988E−05 | 1.840E−06 | 3.674E−07 | −2.110E−11 | 1.829E−13 |
| 26th coefficient(N) | 1.386E−01 | 1.982E−03 | −1.633E−04 | −6.211E−06 | −1.142E−07 | −1.901E−08 | 3.536E−13 | −1.530E−14 |
| 28th coefficient(O) | −1.576E−02 | −1.561E−04 | 1.307E−05 | 3.244E−07 | 4.181E−09 | 5.815E−10 | −3.551E−15 | 2.710E−16 |
| 30th coefficient(P) | 8.067E−04 | 5.507E−06 | −4.706E−07 | −7.546E−09 | −6.851E−11 | −7.961E−12 | 1.616E−17 | −1.735E−18 |

Figure 8:
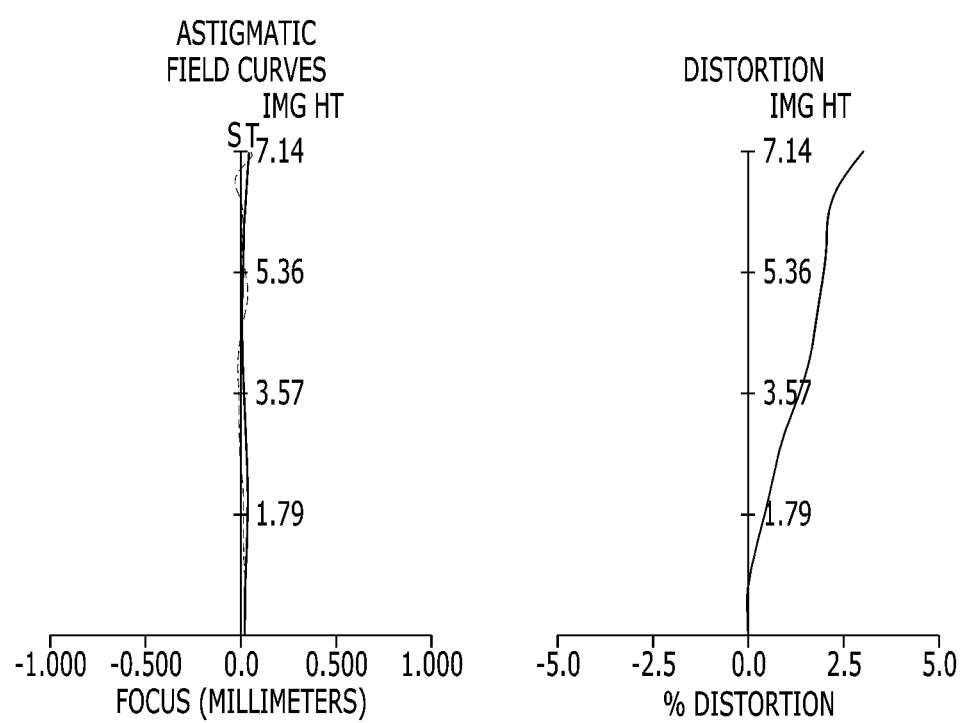
FIG. 8 is curves indicating aberration properties of the optical imaging system illustrated in FIG. 7.

Also, the optical imaging system configured as described above may have the aberration characteristics illustrated in FIG. 8.

Figure 9:
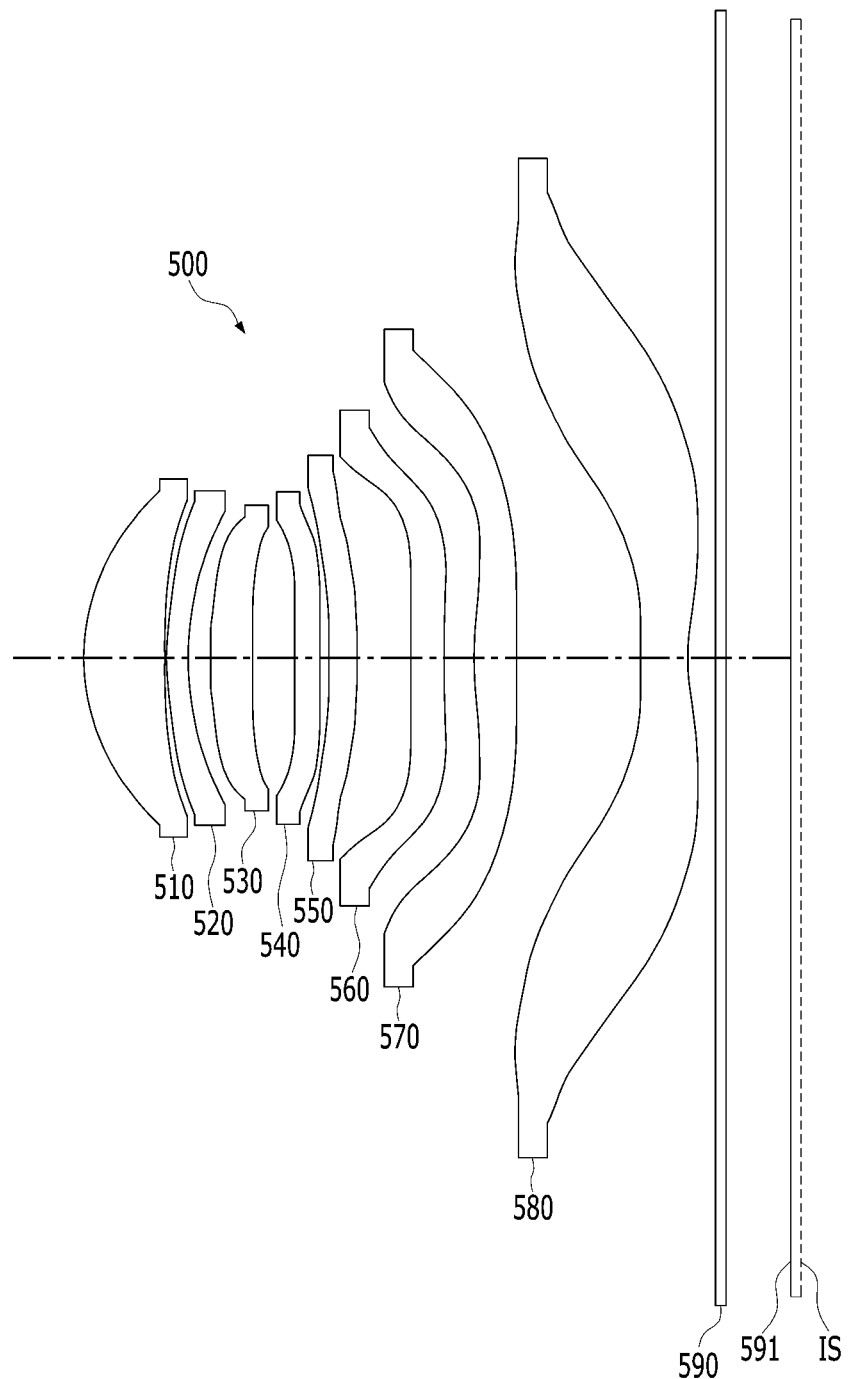
FIG. 9 is a diagram illustrating an optical imaging system according to a fifth example embodiment of the present disclosure.

An optical imaging system 500, according to a fifth example embodiment, will be described with reference to FIGS. 9 and 10.

The optical imaging system 500 in the fifth example embodiment may include an optical system including a first lens 510, a second lens 520, a third lens 530, a fourth lens 540, and a fifth lens 550, a sixth lens 560, a seventh lens 570, and an eighth lens 580 and may further include a filter 590 and an image sensor IS.

The optical imaging system 500 in the fifth example embodiment may form a focus on the imaging plane 591. The imaging plane 591 may refer to a surface on which a focus may be formed by the optical imaging system. For example, the imaging plane 591 may refer to one surface of the image sensor IS on which light is received.

The lens characteristics of each lens (a radius of curvature, a thickness of the lens or a distance between the lenses, a refractive index, an Abbe number, and a focal length) are listed in Table 9.

TABLE 9

| Surface No. | Note | Radius of curvature | Thickness or distance | Refractive index | Abbe number | Focal length |
|---|---|---|---|---|---|---|
| S1 | First lens | 2.626 | 0.873 | 1.544 | 56.0 | 6.51 |
| S2 | | 8.871 | 0.027 | | | |
| S3 | Second lens | 4.527 | 0.220 | 1.680 | 18.2 | −16.55 |
| S4 | | 3.176 | 0.259 | | | |
| S5 | Third lens | 7.225 | 0.454 | 1.535 | 55.7 | 24.21 |
| S6 | | 15.902 | 0.460 | | | |
| S7 | Fourth lens | 87.672 | 0.275 | 1.680 | 18.2 | 3953.4 |
| S8 | | 90.471 | 0.095 | | | |
| S9 | Fifth lens | −9.099 | 0.305 | 1.567 | 37.4 | −102.84 |
| S10 | | −10.899 | 0.595 | | | |
| S11 | Sixth lens | 11.730 | 0.342 | 1.614 | 25.9 | −28.86 |

TABLE 9-continued

| Surface No. | Note | Radius of curvature | Thickness or distance | Refractive index | Abbe number | Focal length |
|---|---|---|---|---|---|---|
| S12 | | 7.006 | 0.346 | | | |
| S13 | Seventh lens | 6.009 | 0.455 | 1.567 | 37.4 | 9.18 |
| S14 | | −39.843 | 1.363 | | | |
| S15 | Eighth lens | −34.685 | 0.515 | 1.535 | 55.7 | −5.52 |
| S16 | | 3.258 | 0.300 | | | |
| S17 | Filter | Infinity | 0.110 | 1.517 | 64.2 | |
| S18 | | Infinity | 0.826 | | | |
| S19 | Imaging plane | Infinity | | | | |

The total focal length f of the optical imaging system 500 in the fifth example embodiment may be 7.24 mm, MG HT may be 7.145 mm, FOV may be 87.2°, SAG52 may be −0.277 mm, SAG62 may be −0.794 mm, SAG72 may be −1.130 mm, and SAG82 may be −1.546 mm.

In the fifth example embodiment, the first lens 510 may have positive refractive power, the first surface of the first lens 510 may be convex, and the second surface of the first lens 510 may be concave.

The second lens 520 may have negative refractive power, a first surface of the second lens 520 may be convex, and a second surface of the second lens 520 may be concave.

The third lens 530 may have positive refractive power, a first surface of the third lens 530 may be convex, and a second surface of the third lens 530 may be concave.

The fourth lens 540 may have positive refractive power, and a first surface of the fourth lens 540 may be convex, and a second surface of the fourth lens 540 may be concave.

The fifth lens 550 may have negative refractive power, the first surface of the fifth lens 550 may be concave, and the second surface of the fifth lens 550 may be convex.

The sixth lens 560 may have positive refractive power, the first surface of the sixth lens 560 may be convex, and the second surface of the sixth lens 560 may be concave.

Also, at least one inflection point may be formed on at least one of the first and second surfaces of the sixth lens 560. For example, the first surface of the sixth lens 560 may be convex in the paraxial region and may be concave in a portion other than the paraxial region. The second surface of the sixth lens 560 may be concave in the paraxial region and may be convex in a portion other than the paraxial region.

The seventh lens 570 may have positive refractive power, and the first and second surfaces of the seventh lens 570 may be convex in the paraxial region.

Also, at least one inflection point may be formed on at least one of the first and second surfaces of the seventh lens 570. For example, the first surface of the seventh lens 570 may be convex in the paraxial region and may be concave in a portion other than the paraxial region. The second surface of the seventh lens 570 may be convex in the paraxial region and may be concave in a portion other than the paraxial region.

The eighth lens 580 may have negative refractive power, and the first and second surfaces of the eighth lens 580 may be concave in the paraxial region.

Also, at least one inflection point may be formed on at least one of the first and second surfaces of the eighth lens 580. For example, the first surface of the eighth lens 580 may be convex in the paraxial region and may be concave in a portion other than the paraxial region. The second surface of the eighth lens 580 may be concave in the paraxial region and may be convex in a portion other than the paraxial region.

Each surface of the first lens 510 to the eighth lens 580 may have an aspherical coefficient as in Table 10. For example, both the object-side surface and the image-side surface of the first lens 510 to the eighth lens 580 may be aspherical.

TABLE 10

| | S1 | S2 | S3 | S4 | S5 | S6 | S7 | S8 |
|---|---|---|---|---|---|---|---|---|
| Conic constant(K) | −0.895 | 21.148 | −19.749 | −5.002 | 4.823 | −52.841 | −99.000 | −90.482 |
| 4th coefficient(A) | 2.170E−02 | 1.487E−02 | −1.366E−02 | 7.491E−04 | −1.298E−02 | −5.756E−03 | 3.866E−02 | 1.738E−02 |
| 6th coefficient(B) | −1.014E−01 | −2.277E−01 | 1.435E−02 | −6.562E−02 | 8.776E−02 | 6.276E−02 | −5.587E−01 | −1.235E−01 |
| 8th coefficient(C) | 3.488E−01 | 9.573E−01 | 2.980E−02 | 3.269E−01 | −3.606E−01 | −3.187E−01 | 2.912E+00 | 3.137E−01 |
| 10th coefficient(D) | −7.332E−01 | −2.283E+00 | −3.391E−02 | −8.594E−01 | 1.013E+00 | 1.131E+00 | −1.000E+01 | −6.306E−01 |
| 12th coefficient(E) | 1.026E+00 | 3.598E+00 | −8.203E−02 | 1.501E+00 | −1.940E+00 | −2.828E+00 | 2.345E+01 | 9.128E−01 |
| 14th coefficient(F) | −1.001E+00 | −3.983E+00 | 2.438E−01 | −1.852E+00 | 2.635E+00 | 5.083E+00 | −3.874E+01 | −9.402E−01 |
| 16th coefficient(G) | 7.000E−01 | 3.191E+00 | −3.011E−01 | 1.656E+00 | −2.597E+00 | −6.595E+00 | 4.599E+01 | 6.842E−01 |
| 18th coefficient(H) | −3.553E−01 | −1.873E+00 | 2.264E−01 | −1.086E+00 | 1.877E+00 | 6.185E+00 | −3.964E+01 | −3.460E−01 |
| 20th coefficient(J) | 1.311E−01 | 8.058E−01 | −1.136E−01 | 5.218E−01 | −9.947E−01 | −4.176E+00 | 2.481E+01 | 1.172E−01 |
| 22nd coefficient(L) | −3.481E−02 | −2.510E−01 | 3.898E−02 | −1.813E−01 | 3.821E−01 | 2.005E+00 | −1.116E+01 | −2.427E−02 |

TABLE 10-continued

|  |  |  |  |  |  |  |  |  |
|---|---|---|---|---|---|---|---|---|
| 24th coefficient(M) | 6.472E-03 | 5.509E-02 | -9.070E-03 | 4.432E-02 | -1.035E-01 | -6.665E-01 | 3.508E+00 | 2.176E-03 |
| 26th coefficient(N) | -7.991E-04 | -8.073E-03 | 1.370E-03 | -7.219E-03 | 1.873E-02 | 1.457E-01 | -7.318E-01 | 1.992E-04 |
| 28th coefficient(O) | 5.884E-05 | 7.089E-04 | -1.212E-04 | 7.029E-04 | -2.033E-03 | -1.880E-02 | 9.097E-02 | -6.671E-05 |
| 30th coefficient(P) | -1.954E-06 | -2.820E-05 | 4.766E-06 | -3.092E-05 | 1.000E-04 | 1.086E-03 | -5.098E-03 | 4.707E-06 |

|  | S9 | S10 | S11 | S12 | S13 | S14 | S15 | S16 |
|---|---|---|---|---|---|---|---|---|
| Conic constant(K) | 3.924 | 9.132 | -6.150 | 2.180 | 2.311 | -99.000 | 7.851 | -12.311 |
| 4th coefficient(A) | 2.487E-02 | -1.359E-02 | -1.933E-02 | -5.545E-02 | -3.181E-02 | -1.619E-03 | -9.858E-02 | -6.582E-02 |
| 6th coefficient(B) | -4.490E-02 | 4.159E-02 | -6.914E-02 | -3.500E-03 | 7.627E-03 | 7.334E-03 | 5.306E-02 | 3.441E-02 |
| 8th coefficient(C) | 5.471E-02 | -1.281E-01 | 1.916E-01 | 4.333E-02 | -3.057E-03 | -8.380E-03 | -2.157E-02 | -1.272E-02 |
| 10th coefficient(D) | -9.463E-02 | 2.132E-01 | -3.163E-01 | -7.184E-02 | -5.230E-03 | 2.577E-03 | 6.054E-03 | 3.231E-03 |
| 12th coefficient(E) | 1.763E-01 | -2.243E-01 | 3.512E-01 | 7.034E-02 | 6.504E-03 | 4.377E-05 | -1.155E-03 | -5.794E-04 |
| 14th coefficient(F) | -2.442E-01 | 1.596E-01 | -2.742E-01 | -4.607E-02 | -3.628E-03 | -2.407E-04 | 1.538E-04 | 7.508E-05 |
| 16th coefficient(G) | 2.303E-01 | -7.913E-02 | 1.536E-01 | 2.101E-02 | 1.272E-03 | 7.824E-05 | -1.467E-05 | -7.124E-06 |
| 18th coefficient(H) | -1.477E-01 | 2.768E-02 | -6.223E-02 | -6.793E-03 | -3.062E-04 | -1.406E-05 | 1.017E-06 | 4.972E-07 |
| 20th coefficient(J) | 6.493E-02 | -6.842E-03 | 1.823E-02 | 1.564E-03 | 5.197E-05 | 1.664E-06 | -5.139E-08 | -2.541E-08 |
| 22nd coefficient(L) | -1.957E-02 | 1.184E-03 | -3.817E-03 | -2.543E-04 | -6.201E-06 | -1.364E-07 | 1.875E-09 | 9.376E-10 |
| 24th coefficient(M) | 3.973E-03 | -1.400E-04 | 5.558E-04 | 2.844E-05 | 5.080E-07 | 7.778E-09 | -4.812E-11 | -2.427E-11 |
| 26th coefficient(N) | -5.197E-04 | 1.073E-05 | -5.337E-05 | -2.081E-06 | -2.715E-08 | -2.969E-10 | 8.251E-13 | 4.175E-13 |
| 28th coefficient(O) | 3.955E-05 | -4.798E-07 | 3.036E-06 | 8.959E-08 | 8.520E-10 | 6.859E-12 | -8.486E-15 | -4.284E-15 |
| 30th coefficient(P) | -1.331E-06 | 9.480E-09 | -7.736E-08 | -1.720E-09 | -1.190E-11 | -7.264E-14 | 3.961E-17 | 1.984E-17 |

Figure 10:
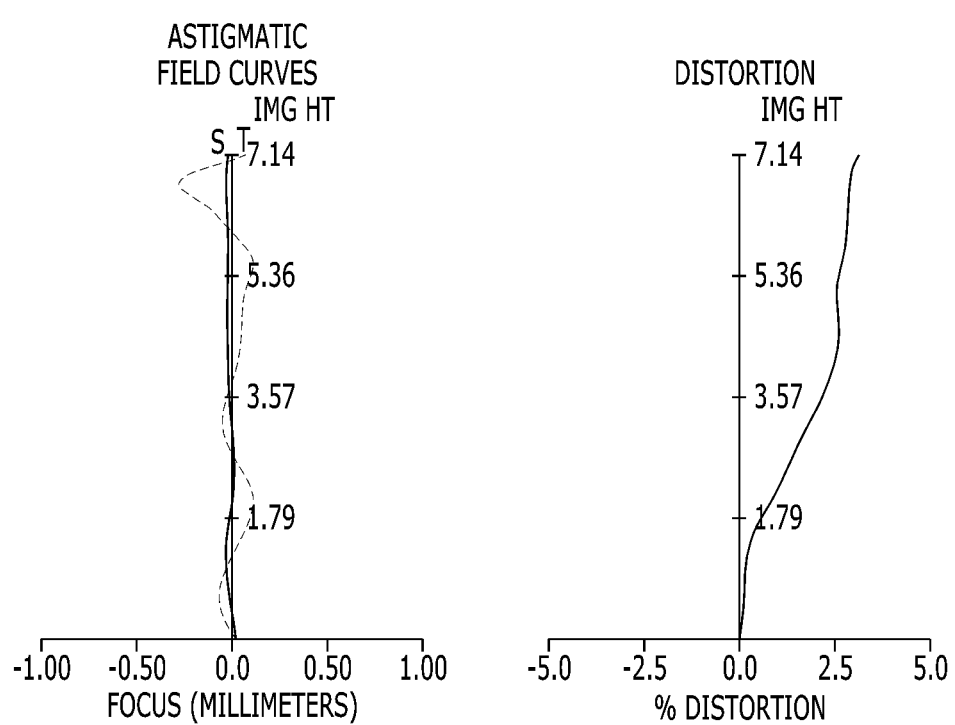
FIG. 10 is curves indicating aberration properties of the optical imaging system illustrated in FIG. 9.

Also, the optical imaging system configured as described above may have the aberration characteristics illustrated in FIG. 10.

Figure 11:
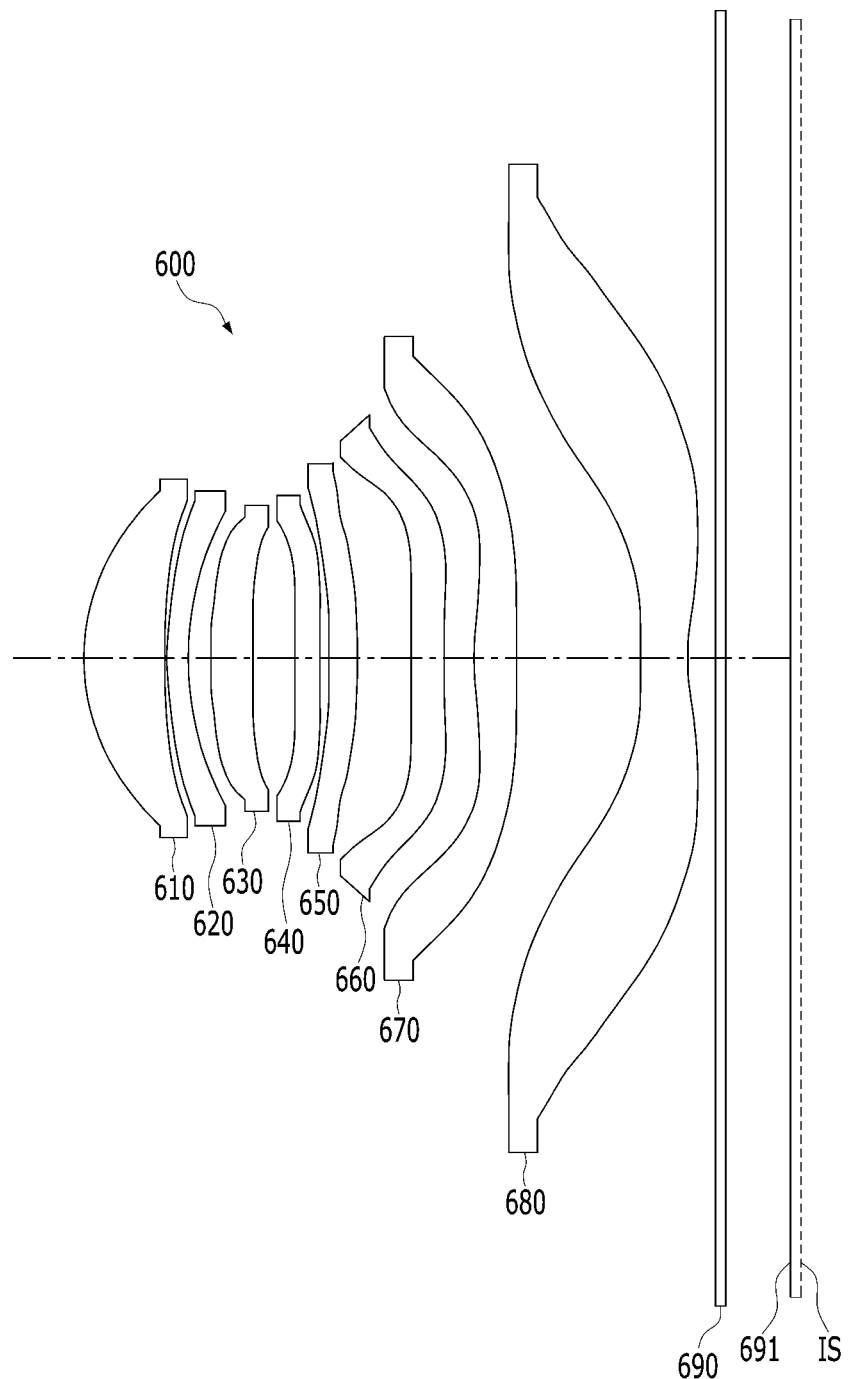
FIG. 11 is a diagram illustrating an optical imaging system according to a sixth example embodiment of the present disclosure.

An optical imaging system 600, according to a sixth example embodiment, will be described with reference to FIGS. 11 and 12.

The optical imaging system 600 in the sixth example embodiment may include an optical system including a first lens 610, a second lens 620, a third lens 630, a fourth lens 640, a fifth lens 650, a sixth lens 660, a seventh lens 670, and an eighth lens 680 and may further include a filter 690 and an image sensor IS.

The optical imaging system 600 in the sixth example embodiment may form a focus on the imaging plane 691. The imaging plane 691 may refer to a surface on which a focus may be formed by the optical imaging system. For example, the imaging plane 691 may refer to one surface of the image sensor IS on which light is received.

The lens characteristics of each lens (a radius of curvature, a thickness of the lens or a distance between the lenses, a refractive index, an Abbe number, and a focal length) are listed in Table 11.

TABLE 11

| Surface No. | Note | Radius of curvature | Thickness or distance | Refractive index | Abbe number | Focal length |
|---|---|---|---|---|---|---|
| S1 | First lens | 2.635 | 0.878 | 1.544 | 56.0 | 6.5 |
| S2 |  | 9.007 | 0.025 |  |  |  |
| S3 | Second lens | 4.490 | 0.220 | 1.680 | 18.2 | -15.55 |
| S4 |  | 3.101 | 0.232 |  |  |  |
| S5 | Third lens | 6.974 | 0.477 | 1.535 | 55.7 | 22.03 |
| S6 |  | 16.576 | 0.463 |  |  |  |
| S7 | Fourth lens | 662.033 | 0.281 | 1.680 | 18.2 | 321.19 |
| S8 |  | -332.471 | 0.131 |  |  |  |
| S9 | Fifth lens | -7.659 | 0.309 | 1.535 | 55.7 | -110.18 |
| S10 |  | -8.922 | 0.554 |  |  |  |
| S11 | Sixth lens | 12.649 | 0.340 | 1.614 | 25.9 | -25.9 |
| S12 |  | 7.003 | 0.320 |  |  |  |

TABLE 11-continued

| Surface No. | Note | Radius of curvature | Thickness or distance | Refractive index | Abbe number | Focal length |
|---|---|---|---|---|---|---|
| S13 | Seventh lens | 6.009 | 0.453 | 1.567 | 37.4 | 9.27 |
| S14 | | −43.227 | 1.406 | | | |
| S15 | Eighth lens | −27.274 | 0.550 | 1.535 | 55.7 | −5.38 |
| S16 | | 3.252 | 0.300 | | | |
| S17 | Filter | Infinity | 0.110 | 1.517 | 64.2 | |
| S18 | | Infinity | 0.770 | | | |
| S19 | Imaging plane | Infinity | | | | |

The total focal length f of the optical imaging system 600 in the sixth example embodiment may be 7.23 mm, MG HT may be 7.145 mm, FOV may be 87.2°, SAG52 may be −0.322 mm, SAG62 may be −0.770 mm, SAG72 may be −1.098 mm, and SAG82 may be −1.702 mm.

In the sixth example embodiment, the first lens 610 may have positive refractive power, the first surface of the first lens 610 may be convex, and the second surface of the first lens 610 may be concave.

The second lens 620 may have negative refractive power, a first surface of the second lens 620 may be convex, and a second surface of the second lens 620 may be concave.

The third lens 630 may have positive refractive power, a first surface of the third lens 630 may be convex, and a second surface of the third lens 630 may be concave.

The fourth lens 640 may have positive refractive power, and first and second surfaces of the fourth lens 640 may be convex.

The fifth lens 650 may have negative refractive power, the first surface of the fifth lens 650 may be concave, and the second surface of the fifth lens 650 may be convex.

The sixth lens 660 may have negative refractive power, the first surface of the sixth lens 660 may be convex, and the second surface of the sixth lens 660 may be concave.

Also, at least one inflection point may be formed on at least one of the first and second surfaces of the sixth lens 660. For example, the first surface of the sixth lens 660 may be convex in the paraxial region and may be concave in a portion other than the paraxial region. Also, the second surface of the sixth lens 660 may be concave in the paraxial region and may be convex in a portion other than the paraxial region.

The seventh lens 670 may have positive refractive power, and the first and second surfaces of the seventh lens 670 may be convex in the paraxial region.

Also, at least one inflection point may be formed on at least one of the first and second surfaces of the seventh lens 670. For example, the first surface of the seventh lens 670 may be convex in the paraxial region and may be concave in a portion other than the paraxial region. Also, the second surface of the seventh lens 670 may be convex in the paraxial region and may be concave in a portion other than the paraxial region.

The eighth lens 680 may have negative refractive power, and the first and second surfaces of the eighth lens 680 may be concave in the paraxial region.

Also, at least one inflection point may be formed on at least one of the first and second surfaces of the eighth lens 680. For example, the first surface of the eighth lens 280 may be concave in the paraxial region and may be convex in a portion other than the paraxial region. The second surface of the eighth lens 680 may be concave in the paraxial region and may be convex in a portion other than the paraxial region.

Each surface of the first lens 610 to the eighth lens 680 may have an aspherical coefficient as in Table 12. For example, both the object-side surface and the image-side surface of the first lens 610 to the eighth lens 680 may be aspherical.

TABLE 12

| | S1 | S2 | S3 | S4 | S5 | S6 | S7 | S8 |
|---|---|---|---|---|---|---|---|---|
| Conic constant(K) | −0.943 | 21.060 | −20.580 | −5.410 | 4.340 | −24.920 | −99.000 | −99.000 |
| 4th coefficient(A) | 1.758E−02 | −7.350E−04 | −2.142E−03 | 7.856E−04 | −1.601E−02 | 3.244E−03 | 5.825E−03 | 2.691E−03 |
| 6th coefficient(B) | −6.172E−02 | −7.034E−02 | −1.760E−02 | −5.626E−02 | 1.067E−01 | −6.199E−03 | −2.787E−01 | −4.795E−02 |
| 8th coefficient(C) | 1.956E−01 | 3.503E−01 | 1.163E−01 | 2.485E−01 | −4.237E−01 | −3.835E−02 | 1.583E+00 | 4.444E−02 |
| 10th coefficient(D) | −3.893E−01 | −9.227E−01 | −2.873E−01 | −5.783E−01 | 1.139E+00 | 3.692E−01 | −6.055E+00 | −1.239E−02 |
| 12th coefficient(E) | 5.236E−01 | 1.570E+00 | 4.415E−01 | 8.652E−01 | −2.123E+00 | −1.311E+00 | 1.558E+01 | −4.270E−02 |
| 14th coefficient(F) | −4.961E−01 | −1.845E+00 | −4.678E−01 | −8.672E−01 | 2.872E+00 | 2.805E+00 | −2.780E+01 | 8.203E−02 |
| 16th coefficient(G) | 3.394E−01 | 1.547E+00 | 3.573E−01 | 5.861E−01 | −2.878E+00 | −4.012E+00 | 3.518E+01 | −8.533E−02 |
| 18th coefficient(H) | −1.696E−01 | −9.397E−01 | −2.012E−01 | −2.591E−01 | 2.148E+00 | 3.991E+00 | −3.201E+01 | 6.520E−02 |
| 20th coefficient(J) | 6.186E−02 | 4.147E−01 | 8.419E−02 | 6.617E−02 | −1.187E+00 | −2.800E+00 | 2.099E+01 | −3.866E−02 |
| 22nd coefficient(L) | −1.628E−02 | −1.316E−01 | −2.597E−02 | −3.858E−03 | 4.777E−01 | 1.381E+00 | −9.830E+00 | 1.709E−02 |

TABLE 12-continued

|  | | | | | | | | |
|---|---|---|---|---|---|---|---|---|
| 24th coefficient(M) | 3.009E−03 | 2.926E−02 | 5.755E−03 | −3.408E−03 | −1.357E−01 | −4.679E−01 | 3.206E+00 | −5.283E−03 |
| 26th coefficient(N) | −3.700E−04 | −4.324E−03 | −8.667E−04 | 1.212E−03 | 2.574E−02 | 1.037E−01 | −6.913E−01 | 1.061E−03 |
| 28th coefficient(O) | 2.714E−05 | 3.815E−04 | 7.930E−05 | −1.780E−04 | −2.920E−03 | −1.354E−02 | 8.860E−02 | −1.233E−04 |
| 30th coefficient(P) | −8.982E−07 | −1.520E−05 | −3.318E−06 | 1.035E−05 | 1.497E−04 | 7.881E−04 | −5.109E−03 | 6.271E−06 |

|  | S9 | S10 | S11 | S12 | S13 | S14 | S15 | S16 |
|---|---|---|---|---|---|---|---|---|
| Conic constant(K) | 4.744 | 9.055 | −8.064 | 2.753 | 2.315 | 96.850 | 2.795 | −12.391 |
| 4th coefficient(A) | 2.296E−02 | −2.946E−03 | −2.230E−02 | −5.333E−02 | −1.955E−02 | 6.421E−03 | −9.791E−02 | −6.704E−02 |
| 6th coefficient(B) | −3.313E−02 | 2.048E−02 | −8.473E−02 | −3.706E−02 | −2.156E−02 | −3.342E−03 | 5.528E−02 | 3.529E−02 |
| 8th coefficient(C) | 5.044E−02 | −9.243E−02 | 2.299E−01 | 1.203E−01 | 3.689E−02 | 2.098E−03 | −2.310E−02 | −1.279E−02 |
| 10th coefficient(D) | −1.307E−01 | 1.800E−01 | −3.522E−01 | −1.764E−01 | −4.344E−02 | −6.081E−03 | 6.504E−03 | 3.147E−03 |
| 12th coefficient(E) | 2.654E−01 | −2.118E−01 | 3.559E−01 | 1.649E−01 | 3.131E−02 | 4.994E−03 | −1.235E−03 | −5.450E−04 |
| 14th coefficient(F) | −3.648E−01 | 1.643E−01 | −2.513E−01 | −1.053E−01 | −1.463E−02 | −2.119E−03 | 1.637E−04 | 6.830E−05 |
| 16th coefficient(G) | 3.410E−01 | −8.722E−02 | 1.273E−01 | 4.735E−02 | 4.699E−03 | 5.632E−04 | −1.556E−05 | −6.290E−06 |
| 18th coefficient(H) | −2.193E−01 | 3.230E−02 | −4.675E−02 | −1.522E−02 | −1.071E−03 | −1.014E−04 | 1.078E−06 | 4.281E−07 |
| 20th coefficient(J) | 9.772E−02 | −8.402E−03 | 1.247E−02 | 3.505E−03 | 1.751E−04 | 1.279E−05 | −5.461E−08 | −2.145E−08 |
| 22nd coefficient(L) | −3.008E−02 | 1.525E−03 | −2.386E−03 | −5.730E−04 | −2.041E−05 | −1.136E−06 | 2.002E−09 | 7.801E−10 |
| 24th coefficient(M) | 6.282E−03 | −1.890E−04 | 3.186E−04 | 6.477E−05 | 1.654E−06 | 6.990E−08 | −5.174E−11 | −2.000E−11 |
| 26th coefficient(N) | −8.503E−04 | 1.521E−05 | −2.814E−05 | −4.808E−06 | −8.846E−08 | −2.837E−09 | 8.948E−13 | 3.425E−13 |
| 28th coefficient(O) | 6.746E−05 | −7.164E−07 | 1.473E−06 | 2.108E−07 | 2.805E−09 | 6.842E−11 | −9.297E−15 | −3.513E−15 |
| 30th coefficient(P) | −2.387E−06 | 1.497E−08 | −3.452E−08 | −4.132E−09 | −3.992E−11 | −7.428E−13 | 4.389E−17 | 1.633E−17 |

Figure 12:
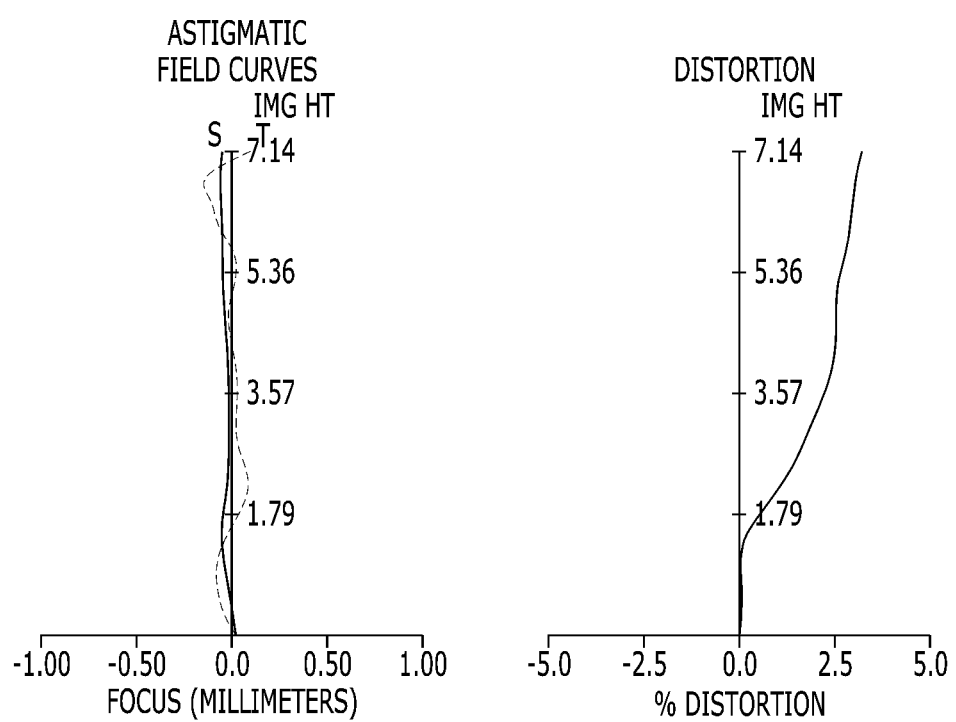
FIG. 12 is curves indicating aberration properties of the optical imaging system illustrated in FIG. 11.

Also, the optical imaging system configured as described above may have the aberration characteristics illustrated in FIG. 12.

Figure 13:
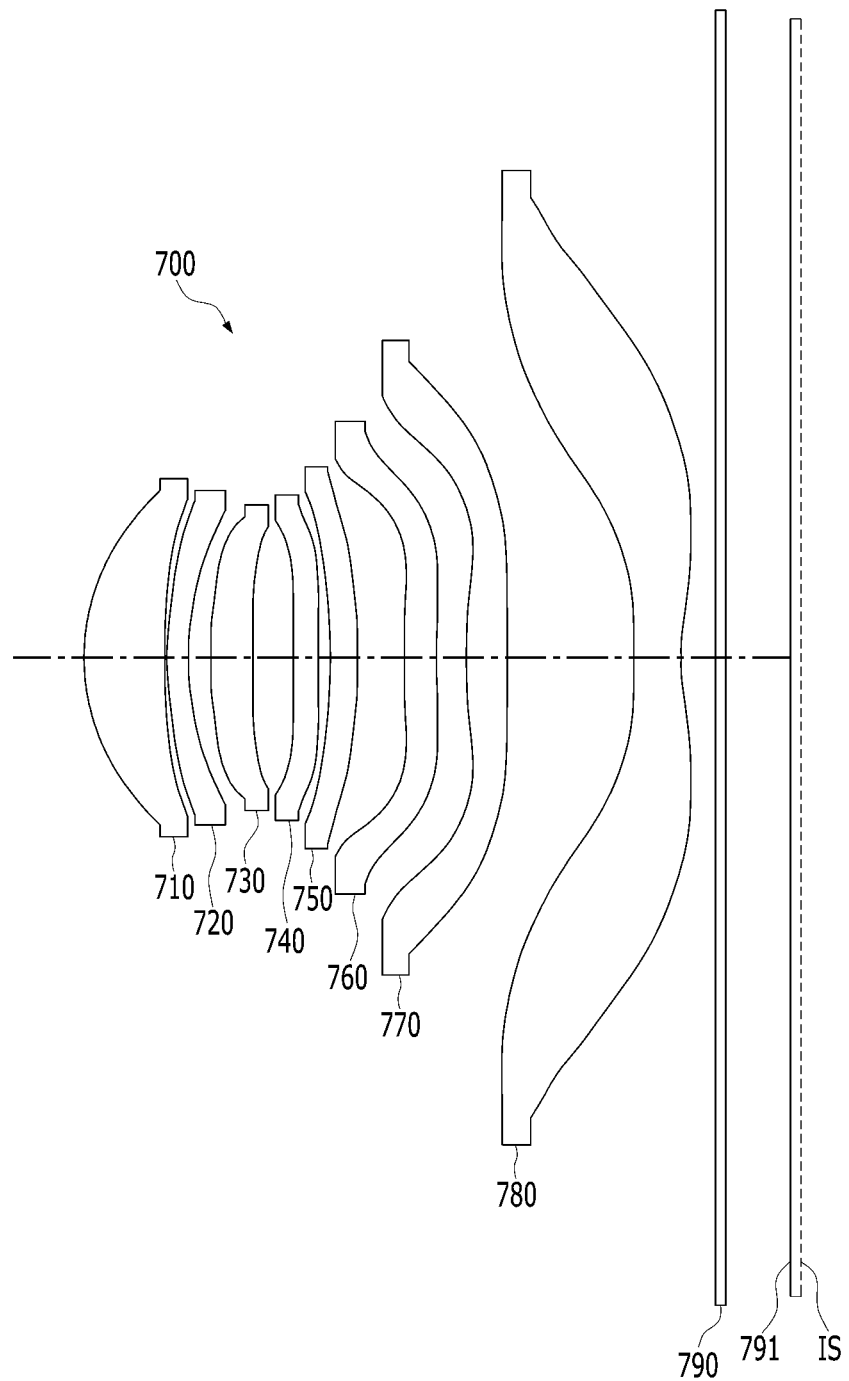
FIG. 13 is a diagram illustrating an optical imaging system according to a seventh example embodiment of the present disclosure.

An optical imaging system 700, according to a seventh example embodiment, will be described with reference to FIGS. 13 and 14.

The optical imaging system 700 in the seventh example embodiment may include an optical system including a first lens 710, a second lens 720, a third lens 730, a fourth lens 740, a fifth lens 750, a sixth lens 760, a seventh lens 770, and an eighth lens 780 and may further include a filter 790 and an image sensor IS.

The optical imaging system 700 in the seventh example embodiment may form a focus on the imaging plane 791. The imaging plane 791 may refer to a surface on which a focus may be formed by the optical imaging system. For example, the imaging plane 791 may refer to one surface of the image sensor IS on which light is received.

The lens characteristics of each lens (a radius of curvature, a thickness of the lens or a distance between the lenses, a refractive index, an Abbe number, and a focal length) are listed in Table 13.

TABLE 13

| Surface No. | Note | Radius of curvature | Thickness or distance | Refractive index | Abbe number | Focal length |
|---|---|---|---|---|---|---|
| S1 | First lens | 2.637 | 0.888 | 1.544 | 56.0 | 6.5 |
| S2 |  | 9.026 | 0.025 |  |  |  |
| S3 | Second lens | 4.387 | 0.220 | 1.680 | 18.2 | −15.17 |
| S4 |  | 3.027 | 0.231 |  |  |  |
| S5 | Third lens | 6.457 | 0.476 | 1.535 | 55.7 | 21.34 |
| S6 |  | 14.404 | 0.469 |  |  |  |
| S7 | Fourth lens | 171.706 | 0.279 | 1.680 | 18.2 | 689.79 |
| S8 |  | 268.619 | 0.124 |  |  |  |
| S9 | Fifth lens | −8.033 | 0.300 | 1.535 | 55.7 | −124.32 |
| S10 |  | −9.250 | 0.528 |  |  |  |

TABLE 13-continued

| Surface No. | Note | Radius of curvature | Thickness or distance | Refractive index | Abbe number | Focal length |
|---|---|---|---|---|---|---|
| S11 | Sixth lens | 12.712 | 0.340 | 1.614 | 25.9 | −25.87 |
| S12 | | 7.018 | 0.335 | | | |
| S13 | Seventh lens | 6.037 | 0.450 | 1.567 | 37.4 | 9.23 |
| S14 | | −40.147 | 1.376 | | | |
| S15 | Eighth lens | −26.801 | 0.592 | 1.535 | 55.7 | −5.43 |
| S16 | | 3.295 | 0.300 | | | |
| S17 | Filter | Infinity | 0.110 | 1.517 | 64.2 | |
| S18 | | Infinity | 0.778 | | | |
| S19 | Imaging plane | Infinity | | | | |

The total focal length f of the optical imaging system 700 in the seventh example embodiment may be 7.23 mm, MG HT may be 7.145 mm, FOV may be 87.2°, SAG52 may be −0.297 mm, SAG62 may be −0.758 mm, SAG72 may be −1.071 mm, and SAG82 may be −1.716 mm.

In the seventh example embodiment, the first lens 710 may have positive refractive power, the first surface of the first lens 710 may be convex, and the second surface of the first lens 710 may be concave.

The second lens 720 may have negative refractive power, a first surface of the second lens 720 may be convex, and a second surface of the second lens 720 may be concave.

The third lens 730 may have positive refractive power, a first surface of the third lens 730 may be convex, and a second surface of the third lens 730 may be concave.

The fourth lens 740 may have positive refractive power, and a first surface of the fourth lens 740 may be convex, and a second surface of the fourth lens 740 may be concave.

The fifth lens 750 may have negative refractive power, the first surface of the fifth lens 750 may be concave, and the second surface of the fifth lens 750 may be convex.

The sixth lens 760 may have positive refractive power, and the first surface of the sixth lens 760 may be convex, and the second surface of the sixth lens 760 may be concave.

Also, at least one inflection point may be formed on at least one of the first and second surfaces of the sixth lens 760. For example, the first surface of the sixth lens 760 may be convex in the paraxial region and may be concave in a portion other than the paraxial region. Also, the second surface of the sixth lens 760 may be concave in the paraxial region and may be convex in a portion other than the paraxial region.

The seventh lens 770 may have positive refractive power, and the first and second surfaces of the seventh lens 770 may be convex in the paraxial region.

Also, at least one inflection point may be formed on at least one of the first and second surfaces of the seventh lens 770. For example, the first surface of the seventh lens 770 may be convex in the paraxial region and may be concave in a portion other than the paraxial region. Also, the second surface of the seventh lens 770 may be concave in the paraxial region and may be convex in a portion other than the paraxial region.

The eighth lens 780 may have negative refractive power, and the first and second surfaces of the eighth lens 780 may be concave in the paraxial region.

Also, at least one inflection point may be formed on at least one of the first and second surfaces of the eighth lens 780. For example, the first surface of the eighth lens 780 may be concave in the paraxial region and may be convex in a portion other than the paraxial region. Also, the second surface of the eighth lens 780 may be concave in the paraxial region and may be convex in a portion other than the paraxial region.

Each surface of the first lens 710 to the eighth lens 780 may have an aspherical coefficient as in Table 14. For example, both the object-side surface and the image-side surface of the first lens 710 to the eighth lens 780 may be aspherical.

TABLE 14

| | S1 | S2 | S3 | S4 | S5 | S6 | S7 | S8 |
|---|---|---|---|---|---|---|---|---|
| Conic constant (K) | −0.949 | 20.988 | −20.519 | −5.487 | 4.218 | −1.339 | −86.054 | −99.000 |
| 4th coefficient (A) | 1.594E−02 | −2.623E−03 | −1.160E−03 | −3.004E−03 | −1.615E−02 | 8.864E−03 | 7.941E−03 | 6.929E−03 |
| 6th coefficient (B) | −5.401E−02 | −5.272E−02 | −2.205E−02 | −3.842E−02 | 1.097E−01 | −2.314E−02 | −3.115E−01 | −9.079E−02 |
| 8th coefficient (C) | 1.748E−01 | 2.730E−01 | 1.237E−01 | 2.037E−01 | −4.327E−01 | −7.615E−02 | 1.746E+00 | 2.040E−01 |
| 10th coefficient (D) | −3.525E−01 | −7.088E−01 | −2.739E−01 | −5.267E−01 | 1.154E+00 | 8.740E−01 | −6.578E+00 | −4.053E−01 |
| 12th coefficient (E) | 4.789E−01 | 1.176E+00 | 3.608E−01 | 8.802E−01 | −2.139E+00 | −3.259E+00 | 1.681E+01 | 6.445E−01 |

TABLE 14-continued

| | | | | | | | | |
|---|---|---|---|---|---|---|---|---|
| 14th coefficient (F) | −4.585E−01 | −1.343E+00 | −3.013E−01 | −1.010E+00 | 2.887E+00 | 7.146E+00 | −2.993E+01 | −7.777E−01 |
| 16th coefficient (G) | 3.176E−01 | 1.092E+00 | 1.546E−01 | 8.211E−01 | −2.893E+00 | −1.038E+01 | 3.792E+01 | 6.884E−01 |
| 18th coefficient (H) | −1.611E−01 | −6.434E−01 | −3.837E−02 | −4.817E−01 | 2.162E+00 | 1.045E+01 | −3.458E+01 | −4.380E−01 |
| 20th coefficient (J) | 5.980E−02 | 2.754E−01 | −5.495E−03 | 2.057E−01 | −1.198E+00 | −7.420E+00 | 2.274E+01 | 1.976E−01 |
| 22nd coefficient (L) | −1.606E−02 | −8.487E−02 | 8.155E−03 | −6.381E−02 | 4.834E−01 | 3.703E+00 | −1.068E+01 | −6.212E−02 |
| 24th coefficient (M) | 3.031E−03 | 1.835E−02 | −3.082E−03 | 1.413E−02 | −1.376E−01 | −1.272E+00 | 3.494E+00 | 1.318E−02 |
| 26th coefficient (N) | −3.810E−04 | −2.643E−03 | 6.208E−04 | −2.138E−03 | 2.615E−02 | 2.866E−01 | −7.555E−01 | −1.780E−03 |
| 28th coefficient (O) | 2.861E−05 | 2.277E−04 | −6.757E−05 | 1.995E−04 | −2.971E−03 | −3.809E−02 | 9.706E−02 | 1.355E−04 |
| 30th coefficient (P) | −9.699E−07 | −8.875E−06 | 3.139E−06 | −8.688E−06 | 1.524E−04 | 2.264E−03 | −5.609E−03 | −4.297E−06 |

| | S9 | S10 | S11 | S12 | S13 | S14 | S15 | S16 |
|---|---|---|---|---|---|---|---|---|
| Conic constant (K) | 4.264 | 9.184 | −11.870 | 2.834 | 2.319 | 83.418 | 2.941 | −11.316 |
| 4th coefficient (A) | 3.749E−02 | 4.177E−03 | −2.364E−02 | −5.703E−02 | −2.272E−02 | 3.968E−03 | −9.212E−02 | −6.560E−02 |
| 6th coefficient (B) | −1.025E−01 | −1.901E−03 | −8.963E−02 | −1.635E−02 | −2.443E−03 | 4.768E−03 | 4.983E−02 | 3.409E−02 |
| 8th coefficient (C) | 2.278E−01 | −4.981E−02 | 2.721E−01 | 7.419E−02 | 7.677E−03 | −7.204E−03 | −2.066E−02 | −1.252E−02 |
| 10th coefficient (D) | −4.386E−01 | 1.250E−01 | −4.770E−01 | −1.212E−01 | −1.798E−02 | 2.347E−04 | 5.839E−03 | 3.148E−03 |
| 12th coefficient (E) | 6.430E−01 | −1.614E−01 | 5.524E−01 | 1.228E−01 | 1.686E−02 | 2.149E−03 | −1.112E−03 | −5.592E−04 |
| 14th coefficient (F) | −6.891E−01 | 1.310E−01 | −4.445E−01 | −8.350E−02 | −9.047E−03 | −1.238E−03 | 1.476E−04 | 7.190E−05 |
| 16th coefficient (G) | 5.317E−01 | −7.149E−02 | 2.550E−01 | 3.944E−02 | 3.190E−03 | 3.725E−04 | −1.403E−05 | −6.788E−06 |
| 18th coefficient (H) | −2.922E−01 | 2.700E−02 | −1.057E−01 | −1.320E−02 | −7.834E−04 | −7.245E−05 | 9.696E−07 | 4.727E−07 |
| 20th coefficient (J) | 1.132E−01 | −7.135E−03 | 3.169E−02 | 3.146E−03 | 1.367E−04 | 9.725E−06 | −4.886E−08 | −2.418E−08 |
| 22nd coefficient (L) | −3.032E−02 | 1.314E−03 | −6.808E−03 | −5.298E−04 | −1.688E−05 | −9.163E−07 | 1.779E−09 | 8.951E−10 |
| 24th coefficient (M) | 5.430E−03 | −1.649E−04 | 1.020E−03 | 6.150E−05 | 1.441E−06 | 5.979E−08 | −4.556E−11 | −2.331E−11 |
| 26th coefficient (N) | −6.094E−04 | 1.345E−05 | −1.011E−04 | −4.678E−06 | −8.084E−08 | −2.580E−09 | 7.794E−13 | 4.048E−13 |
| 28th coefficient (O) | 3.755E−05 | −6.411E−07 | 5.954E−06 | 2.098E−07 | 2.679E−09 | 6.629E−11 | −7.994E−15 | −4.204E−15 |
| 30th coefficient (P) | −9.066E−07 | 1.357E−08 | −1.575E−07 | −4.202E−09 | −3.973E−11 | −7.686E−13 | 3.719E−17 | 1.975E−17 |

Figure 14:
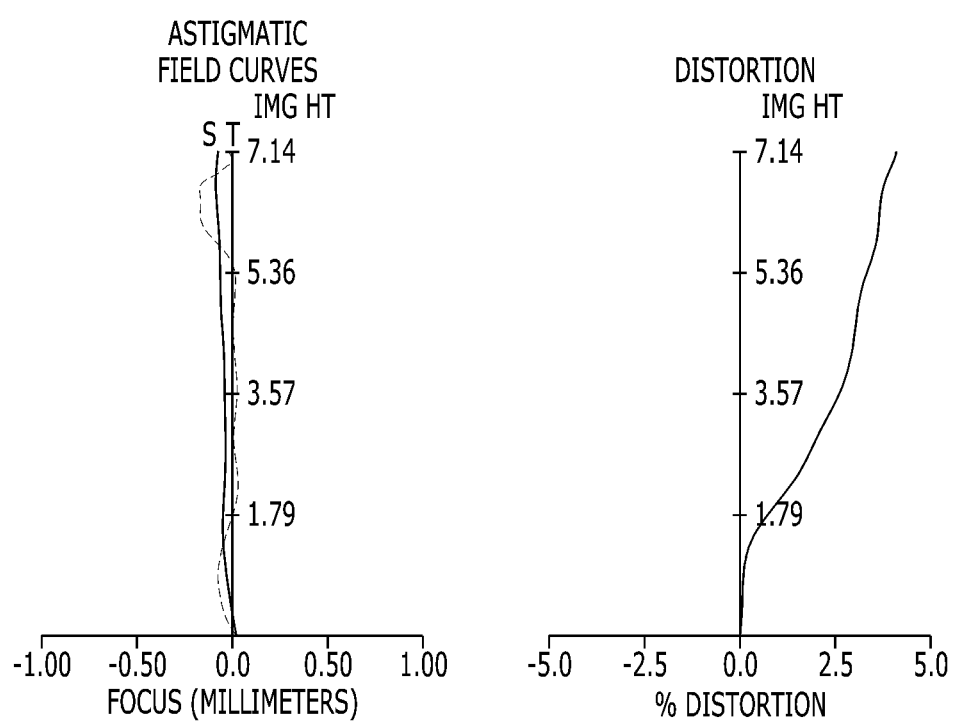
FIG. 14 is curves indicating aberration properties of the optical imaging system illustrated in FIG. 13.

Also, the optical imaging system configured as described above may have the aberration characteristics illustrated in FIG. 14.

Figure 15:
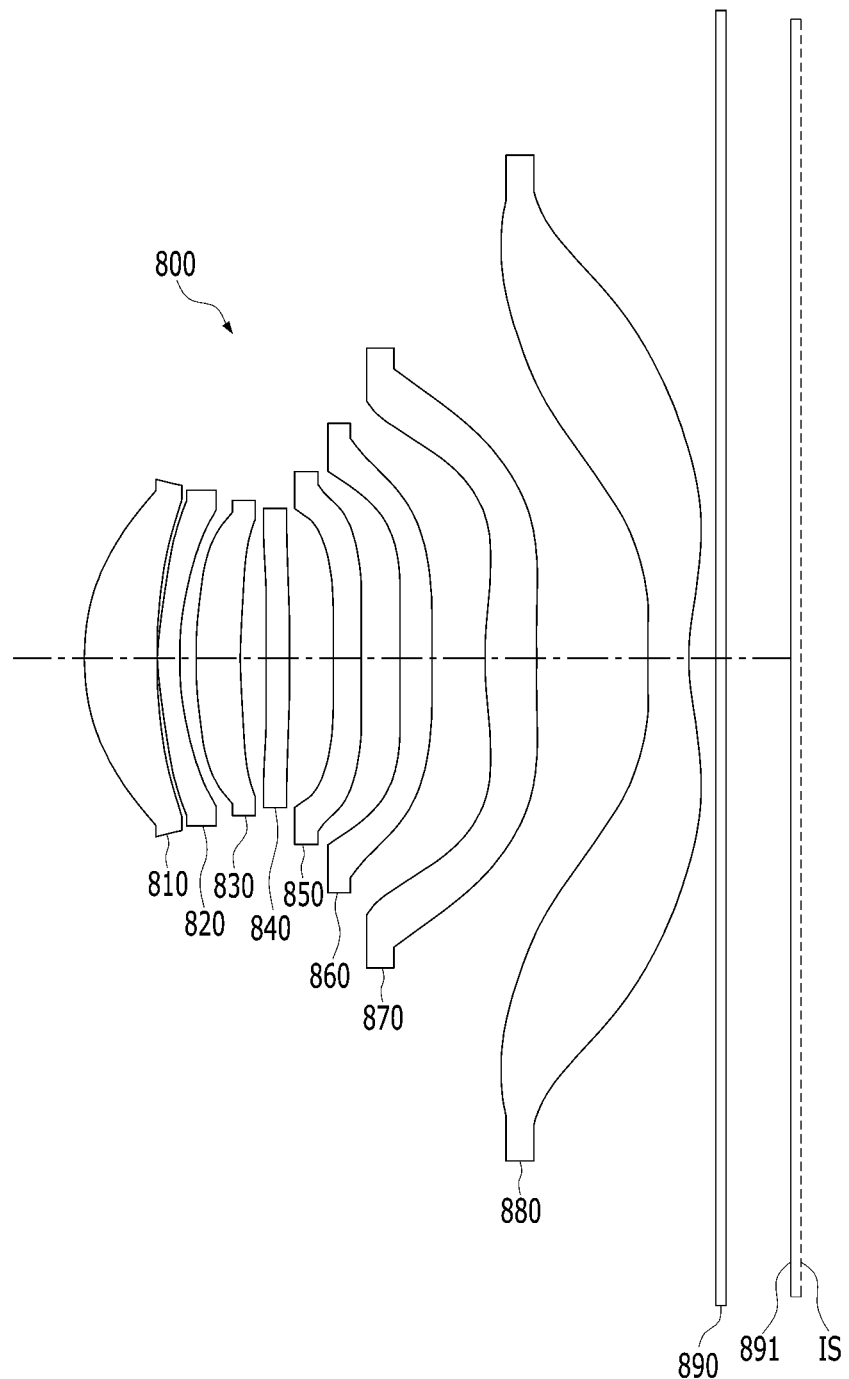
FIG. 15 is a diagram illustrating an optical imaging system according to an eighth example embodiment of the present disclosure.

An optical imaging system 800, according to an eighth example embodiment, will be described with reference to FIGS. 15 and 16.

The optical imaging system 800 in the eighth example embodiment may include an optical system including a first lens 810, a second lens 820, a third lens 830, a fourth lens 840, and a fifth lens 850, a sixth lens 860, a seventh lens 870, and an eighth lens 880 and may further include a filter 890 and an image sensor IS.

The optical imaging system 800 in the seventh example embodiment may form a focus on the imaging plane 891. The imaging plane 891 may refer to a surface on which a focus may be formed by the optical imaging system. For example, the imaging plane 891 may refer to one surface of the image sensor IS on which light is received.

The lens characteristics of each lens (a radius of curvature, a thickness of the lens or a distance between the lenses, a refractive index, an Abbe number, and a focal length) are listed in Table 15.

TABLE 15

| Surface No. | Note | Radius of curvature | Thickness or distance | Refractive index | Abbe number | Focal length |
|---|---|---|---|---|---|---|
| S1 | First lens | 2.588 | 0.808 | 1.544 | 56.0 | 7.08 |
| S2 | | 6.966 | 0.025 | | | |
| S3 | Second lens | 5.731 | 0.220 | 1.680 | 18.2 | −16.19 |
| S4 | | 3.727 | 0.177 | | | |
| S5 | Third lens | 5.321 | 0.495 | 1.535 | 55.7 | 19.24 |
| S6 | | 10.608 | 0.275 | | | |
| S7 | Fourth lens | 64.629 | 0.263 | 1.567 | 37.4 | 82.36 |
| S8 | | −172.166 | 0.475 | | | |
| S9 | Fifth lens | 48.453 | 0.304 | 1.680 | 18.2 | −32.82 |
| S10 | | 15.380 | 0.440 | | | |
| S11 | Sixth lens | 24.823 | 0.343 | 1.635 | 24.0 | −455.55 |
| S12 | | 22.754 | 0.595 | | | |
| S13 | Seventh lens | 4.765 | 0.555 | 1.567 | 37.4 | 13.54 |
| S14 | | 11.898 | 1.237 | | | |
| S15 | Eighth lens | 10.129 | 0.450 | 1.544 | 56.0 | −6.02 |
| S16 | | 2.444 | 0.272 | | | |
| S17 | Filter | Infinity | 0.110 | 1.517 | 64.2 | |
| S18 | | Infinity | 0.795 | | | |
| S19 | Imaging plane | Infinity | | | | |

The total focal length f of the optical imaging system 800 in the eighth example embodiment may be 7.24 mm, MG HT may be 7.145 mm, FOV may be 87.2°, SAG52 may be −0.465 mm, SAG62 may be −0.907 mm, SAG72 may be −1.555 mm, and SAG82 may be −1.713 mm.

In the eighth example embodiment, the first lens 810 may have positive refractive power, the first surface of the first lens 810 may be convex, and the second surface of the first lens 810 may be concave.

The second lens 820 may have negative refractive power, a first surface of the second lens 820 may be convex, and a second surface of the second lens 820 may be concave.

The third lens 830 may have positive refractive power, a first surface of the third lens 830 may be convex, and a second surface of the third lens 830 may be concave.

The fourth lens 840 may have positive refractive power, and first and second surfaces of the fourth lens 840 may be convex.

The fifth lens 850 may have negative refractive power, the first surface of the fifth lens 850 may be convex, and the second surface of the fifth lens 850 may be concave.

The sixth lens 260 may have negative refractive power, the first surface of the sixth lens 260 may be convex in the paraxial region, and the second surface of the sixth lens 260 may be concave in the paraxial region.

Also, at least one inflection point may be formed on at least one of the first and second surfaces of the sixth lens 260. For example, the first surface of the sixth lens 260 may be convex in the paraxial region and may be concave in a portion other than the paraxial region. Also, the second surface of the sixth lens 260 may be concave in the paraxial region and may be convex in a portion other than the paraxial region.

The seventh lens 270 may have positive refractive power, the first surface of the seventh lens 270 may be convex, and the second surface of the seventh lens 270 may be concave.

Also, at least one inflection point may be formed on at least one of the first and second surfaces of the seventh lens 270. For example, the first surface of the seventh lens 270 may be convex in the paraxial region and may be concave in a portion other than the paraxial region. Also, the second surface of the seventh lens 270 may be concave in the paraxial region and may be convex in a portion other than the paraxial region.

The eighth lens 280 may have negative refractive power, the first surface of the eighth lens 180 may be convex in the paraxial region, and the second surface of the eighth lens 280 may be concave in the paraxial region.

Also, at least one inflection point may be formed on at least one of the first and second surfaces of the eighth lens 280. For example, the first surface of the eighth lens 280 may be convex in the paraxial region and may be concave in a portion other than the paraxial region. Also, the second surface of the eighth lens 280 may be concave in the paraxial region and may be convex in a portion other than the paraxial region.

Each surface of the first lens 810 to the seventh lens 870 may have an aspherical coefficient as in Table 16. For example, both the object-side surface and the image-side surface of the first lens 810 to the seventh lens 870 may be aspherical.

TABLE 16

|  | S1 | S2 | S3 | S4 | S5 | S6 | S7 | S8 |
|---|---|---|---|---|---|---|---|---|
| Conic constant (K) | −1.405 | 10.710 | −10.030 | −4.131 | 0.046 | −2.522 | −99.000 | −1.654 |
| 4th coefficient (A) | 1.033E−02 | 3.152E−02 | 2.769E−02 | 6.383E−03 | −1.273E−02 | −6.531E−03 | −7.438E−03 | −2.400E−02 |
| 6th coefficient (B) | −9.338E−03 | −2.107E−01 | −1.693E−01 | −5.834E−02 | 4.066E−02 | 8.877E−03 | −9.261E−02 | 9.506E−02 |
| 8th coefficient (C) | 3.460E−02 | 7.022E−01 | 5.827E−01 | 2.525E−01 | −1.314E−01 | −1.151E−01 | 4.761E−01 | −4.943E−01 |
| 10th coefficient (D) | −7.979E−02 | −1.535E+00 | −1.292E+00 | −6.345E−01 | 2.800E−01 | 5.649E−01 | −1.449E+00 | 1.607E+00 |
| 12th coefficient (E) | 1.200E−01 | 2.315E+00 | 1.980E+00 | 1.079E+00 | −3.443E−01 | −1.572E+00 | 2.908E+00 | −3.442E+00 |
| 14th coefficient (F) | −1.237E−01 | −2.483E+00 | −2.166E+00 | −1.301E+00 | 1.969E−01 | 2.861E+00 | −4.033E+00 | 5.113E+00 |
| 16th coefficient (G) | 9.010E−02 | 1.932E+00 | 1.721E+00 | 1.140E+00 | 6.994E−02 | −3.593E+00 | 3.970E+00 | −5.432E+00 |
| 18th coefficient (H) | −4.708E−02 | −1.100E+00 | −1.002E+00 | −7.347E−01 | −2.322E−01 | 3.194E+00 | −2.812E+00 | 4.192E+00 |
| 20th coefficient (J) | 1.772E−02 | 4.585E−01 | 4.271E−01 | 3.487E−01 | 2.121E−01 | −2.027E+00 | 1.435E+00 | −2.358E+00 |
| 22nd coefficient (L) | −4.757E−03 | −1.381E−01 | −1.316E−01 | −1.206E−01 | −1.123E−01 | 9.121E−01 | −5.221E−01 | 9.581E−01 |
| 24th coefficient (M) | 8.883E−04 | 2.928E−02 | 2.855E−02 | 2.958E−02 | 3.782E−02 | −2.843E−01 | 1.317E−01 | −2.741E−01 |
| 26th coefficient (N) | −1.095E−04 | −4.141E−03 | −4.132E−03 | −4.877E−03 | −8.010E−03 | 5.836E−02 | −2.186E−02 | 5.239E−02 |
| 28th coefficient (O) | 8.008E−06 | 3.505E−04 | 3.579E−04 | 4.845E−04 | 9.773E−04 | −7.094E−03 | 2.140E−03 | −6.012E−03 |
| 30th coefficient (P) | −2.627E−07 | −1.343E−05 | −1.403E−05 | −2.190E−05 | −5.258E−05 | 3.866E−04 | −9.343E−05 | 3.133E−04 |
|  | S9 | S10 | S11 | S12 | S13 | S14 | S15 | S16 |
| Conic constant (K) | −91.947 | −8.094 | −62.550 | −24.666 | 1.134 | −0.257 | 0.000 | −7.956 |
| 4th coefficient (A) | −5.332E−02 | −6.037E−02 | −5.156E−02 | −8.572E−02 | −6.041E−02 | −3.600E−02 | −1.394E−01 | −8.865E−02 |
| 6th coefficient (B) | 1.227E−01 | 1.347E−01 | −2.055E−02 | 7.248E−02 | 1.267E−02 | 1.135E−02 | 6.304E−02 | 4.238E−02 |
| 8th coefficient (C) | −5.699E−01 | −4.495E−01 | 1.887E−01 | −6.796E−02 | −1.973E−05 | −7.236E−03 | −2.108E−02 | −1.379E−02 |
| 10th coefficient (D) | 1.780E+00 | 1.034E+00 | −4.415E−01 | 5.593E−02 | −4.776E−03 | 4.636E−03 | 5.005E−03 | 3.088E−03 |
| 12th coefficient (E) | −3.794E+00 | −1.640E+00 | 6.199E−01 | −3.693E−02 | 4.730E−03 | −2.399E−03 | −8.318E−04 | −4.879E−04 |
| 14th coefficient (F) | 5.678E+00 | 1.830E+00 | −5.914E−01 | 1.780E−02 | −3.021E−03 | 8.616E−04 | 9.856E−05 | 5.548E−05 |

TABLE 16-continued

| | | | | | | | |
|---|---|---|---|---|---|---|---|
| 16th coefficient (G) | −6.092E+00 | −1.462E+00 | 3.988E−01 | −5.912E−03 | 1.358E−03 | −2.053E−04 | −8.483E−06 | −4.602E−06 |
| 18th coefficient (H) | 4.737E+00 | 8.442E−01 | −1.932E−01 | 1.252E−03 | −4.278E−04 | 3.165E−05 | 5.357E−07 | 2.798E−07 |
| 20th coefficient (J) | −2.673E+00 | −3.525E−01 | 6.744E−02 | −1.328E−04 | 9.353E−05 | −2.956E−06 | −2.482E−08 | −1.242E−08 |
| 22nd coefficient (L) | 1.083E+00 | 1.052E−01 | −1.678E−02 | −5.391E−06 | −1.404E−05 | 1.272E−07 | 8.340E−10 | 3.964E−10 |
| 24th coefficient (M) | −3.065E−01 | −2.187E−02 | 2.904E−03 | 3.884E−06 | 1.416E−06 | 3.535E−09 | −1.977E−11 | −8.832E−12 |
| 26th coefficient (N) | 5.754E−02 | 3.002E−03 | −3.316E−04 | −5.493E−07 | −9.155E−08 | −7.331E−10 | 3.134E−13 | 1.300E−13 |
| 28th coefficient (O) | −6.433E−03 | −2.443E−04 | 2.247E−05 | 3.645E−08 | 3.430E−09 | 3.503E−11 | −2.981E−15 | −1.132E−15 |
| 30th coefficient (P) | 3.241E−04 | 8.915E−06 | −6.844E−07 | −9.807E−10 | −5.663E−11 | −6.022E−13 | 1.286E−17 | 4.396E−18 |

Figure 16:
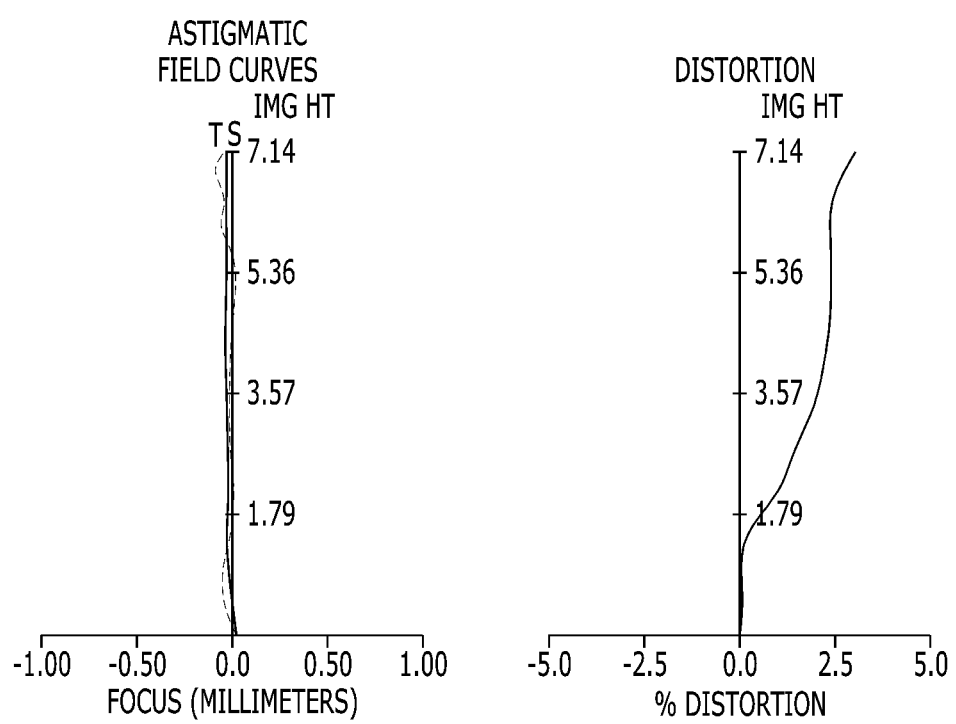
FIG. 16 is curves indicating aberration properties of the optical imaging system illustrated in FIG. 15.

Also, the optical imaging system configured as described above may have the aberration characteristics illustrated in FIG. 16.

Figure 17:
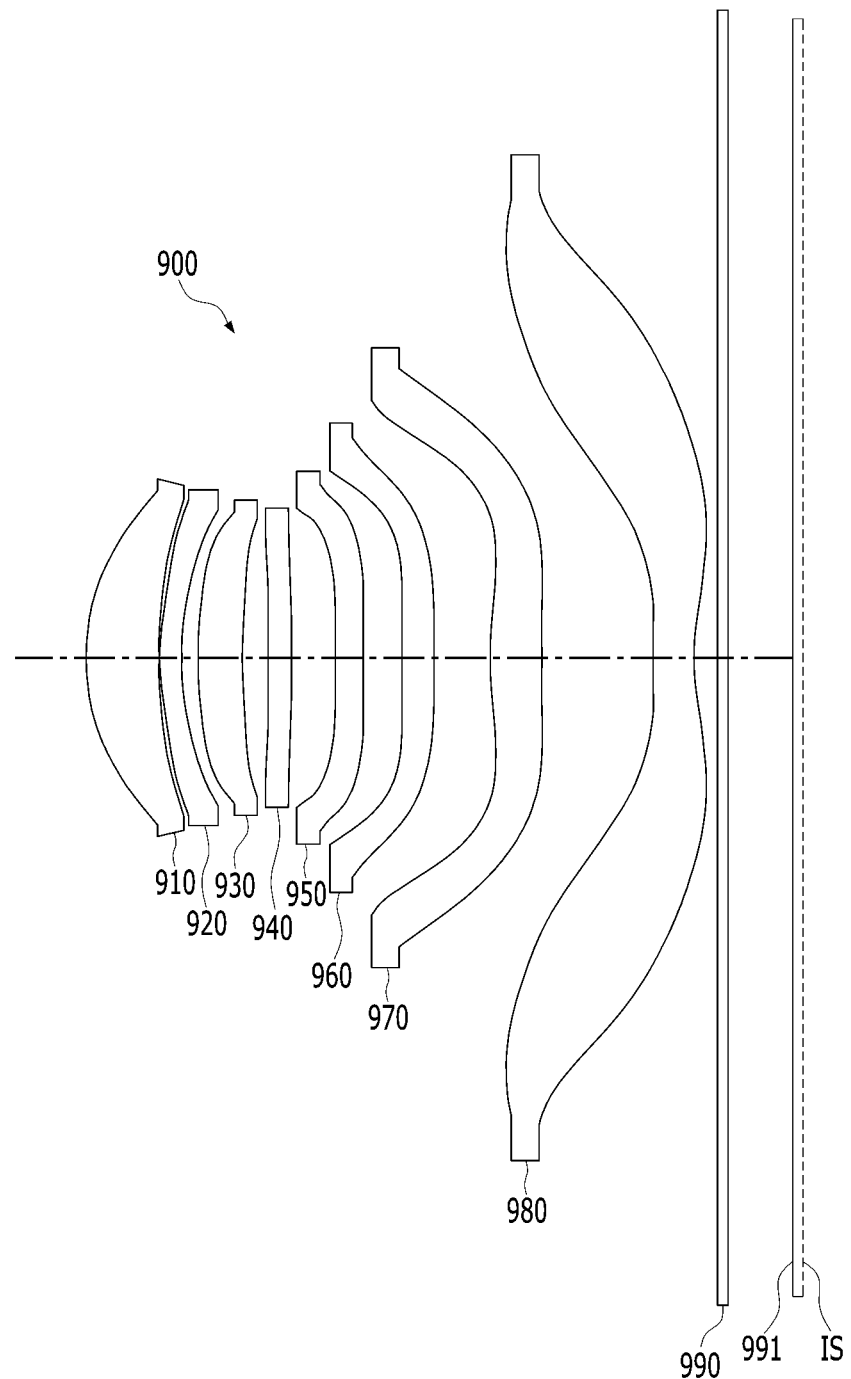
FIG. 17 is a diagram illustrating an optical imaging system according to a ninth example embodiment of the present disclosure.

An optical imaging system 900, according to a ninth example embodiment, will be described with reference to FIGS. 17 and 18.

The optical imaging system 900 in the ninth example embodiment may include an optical system including a first lens 910, a second lens 920, a third lens 930, a fourth lens 940, a fifth lens 950, a sixth lens 960, a seventh lens 970, and an eighth lens 980 and may further include a filter 990 and an image sensor IS.

The optical imaging system 900 in the seventh example embodiment may form a focus on the imaging plane 991. The imaging plane 991 may refer to a surface on which a focus may be formed by the optical imaging system. For example, the imaging plane 991 may refer to one surface of the image sensor IS on which light is received.

The lens characteristics of each lens (a radius of curvature, a thickness of the lens or a distance between the lenses, a refractive index, an Abbe number, and a focal length) are listed in Table 17.

TABLE 17

| Surface No. | Note | Radius of curvature | Thickness or distance | Refractive index | Abbe number | Focal length |
|---|---|---|---|---|---|---|
| S1 | First lens | 2.574 | 0.790 | 1.544 | 56.0 | 7.09 |
| S2 | | 6.851 | 0.025 | | | |
| S3 | Second lens | 5.666 | 0.220 | 1.680 | 18.2 | −16.4 |
| S4 | | 3.714 | 0.178 | | | |
| S5 | Third lens | 5.493 | 0.510 | 1.535 | 55.7 | 18.53 |
| S6 | | 11.862 | 0.277 | | | |
| S7 | Fourth lens | 249.628 | 0.253 | 1.567 | 37.4 | 108.63 |
| S8 | | −82.455 | 0.469 | | | |
| S9 | Fifth lens | 68.058 | 0.305 | 1.680 | 18.2 | −31.39 |
| S10 | | 16.384 | 0.440 | | | |
| S11 | Sixth lens | 17.841 | 0.340 | 1.635 | 24.0 | −6283.41 |
| S12 | | 17.630 | 0.614 | | | |
| S13 | Seventh lens | 4.769 | 0.549 | 1.567 | 37.4 | 13.41 |
| S14 | | 12.115 | 1.216 | | | |
| S15 | Eighth lens | 10.670 | 0.450 | 1.544 | 56.0 | −6.1 |
| S16 | | 2.500 | 0.272 | | | |
| S17 | Filter | Infinity | 0.110 | 1.517 | 64.2 | |
| S18 | | Infinity | 0.822 | | | |
| S19 | Imaging plane | Infinity | | | | |

The total focal length f of the optical imaging system 900 in the ninth example embodiment may be 7.24 mm, MG HT may be 7.145 mm, FOV may be 87.2°, SAG52 may be −0.464 mm, SAG62 may be −0.903 mm, SAG72 may be −1.562 mm, and SAG82 may be −1.769 mm.

In the ninth example embodiment, the first lens 910 may have positive refractive power, the first surface of the first lens 910 may be convex, and the second surface of the first lens 910 may be concave.

The second lens 920 may have negative refractive power, a first surface of the second lens 920 may be convex, and a second surface of the second lens 920 may be concave.

The third lens 930 may have positive refractive power, a first surface of the third lens 930 may be convex, and a second surface of the third lens 930 may be concave.

The fourth lens 940 may have negative refractive power, the first and second surfaces of the fourth lens 940 may be convex.

The fifth lens 950 may have negative refractive power, the first surface of the fifth lens 950 may be convex, and the second surface of the fifth lens 950 may be concave.

The sixth lens 960 may have negative refractive power, the first surface of the sixth lens 960 may be convex, and the second surface of the sixth lens 960 may be concave.

Also, at least one inflection point may be formed on at least one of the first and second surfaces of the sixth lens 960. For example, the first surface of the sixth lens 960 may be convex in the paraxial region and may be concave in a portion other than the paraxial region. Also, the second surface of the sixth lens 960 may be concave in the paraxial region and may be convex in a portion other than the paraxial region.

The seventh lens 970 may have positive refractive power, the first surface of the seventh lens 970 may be convex, and the second surface of the seventh lens 970 may be concave.

Also, at least one inflection point may be formed on at least one of the first and second surfaces of the seventh lens 970. For example, the first surface of the seventh lens 970 may be convex in the paraxial region and may be concave in a portion other than the paraxial region. Also, the second surface of the seventh lens 970 may be concave in the paraxial region and may be convex in a portion other than the paraxial region.

The eighth lens 980 may have negative refractive power, the first surface of the eighth lens 980 may be convex in the paraxial region, and the second surface of the eighth lens 980 may be concave in the paraxial region.

Also, at least one inflection point may be formed on at least one of the first and second surfaces of the eighth lens 980. For example, the first surface of the eighth lens 980 may be convex in the paraxial region and may be concave in a portion other than the paraxial region. Also, the second surface of the eighth lens 980 may be concave in the paraxial region and may be convex in a portion other than the paraxial region.

Each surface of the first lens 910 to the eighth lens 980 may have an aspherical coefficient as in Table 18. For example, both the object-side surface and the image-side surface of the first lens 910 to the eighth lens 980 may be aspherical.

TABLE 18

| | S1 | S2 | S3 | S4 | S5 | S6 | S7 | S8 |
|---|---|---|---|---|---|---|---|---|
| Conic constant (K) | −1.409 | 10.628 | −10.223 | −4.310 | 0.269 | −6.764 | −99.000 | 99.000 |
| 4th coefficient (A) | 4.785E−03 | 1.137E−03 | −4.263E−04 | −5.237E−03 | −1.003E−02 | −1.560E−02 | −1.226E−02 | −2.778E−02 |
| 6th coefficient (B) | 1.987E−02 | −1.686E−02 | 2.781E−02 | 4.740E−02 | 3.698E−02 | 8.897E−02 | −5.725E−02 | 1.251E−01 |
| 8th coefficient (C) | −6.572E−02 | 7.589E−02 | −9.975E−02 | −1.780E−01 | −1.336E−01 | −4.343E−01 | 3.047E−01 | −6.939E−01 |
| 10th coefficient (D) | 1.480E−01 | −2.068E−01 | 2.694E−01 | 4.786E−01 | 3.556E−01 | 1.251E+00 | −9.669E−01 | 2.372E+00 |
| 12th coefficient (E) | −2.299E−01 | 3.495E−01 | −5.189E−01 | −8.836E−01 | −6.276E−01 | −2.329E+00 | 2.052E+00 | −5.292E+00 |
| 14th coefficient (F) | 2.502E−01 | −4.149E−01 | 6.759E−01 | 1.126E+00 | 7.400E−01 | 2.986E+00 | −3.025E+00 | 8.151E+00 |
| 16th coefficient (G) | −1.937E−01 | 3.666E−01 | −5.995E−01 | −1.005E+00 | −5.795E−01 | −2.727E+00 | 3.181E+00 | −8.947E+00 |
| 18th coefficient (H) | 1.079E−01 | −2.435E−01 | 3.687E−01 | 6.379E−01 | 2.904E−01 | 1.808E+00 | −2.421E+00 | 7.114E+00 |
| 20th coefficient (J) | −4.330E−02 | 1.201E−01 | −1.586E−01 | −2.883E−01 | −8.013E−02 | −8.752E−01 | 1.337E+00 | −4.113E+00 |
| 22nd coefficient (L) | 1.241E−02 | −4.296E−02 | 4.746E−02 | 9.192E−02 | 1.976E−03 | 3.071E−01 | −5.306E−01 | 1.713E+00 |
| 24th coefficient (M) | −2.478E−03 | 1.077E−02 | −9.635E−03 | −2.014E−02 | 7.022E−03 | −7.634E−02 | 1.475E−01 | −5.006E−01 |
| 26th coefficient (N) | 3.276E−04 | −1.786E−03 | 1.257E−03 | 2.873E−03 | −2.548E−03 | 1.279E−02 | −2.730E−02 | 9.749E−02 |

TABLE 18-continued

|  |  |  |  |  |  |  |  |  |
|---|---|---|---|---|---|---|---|---|
| 28th coefficient (O) | −2.577E−05 | 1.756E−04 | −9.397E−05 | −2.388E−04 | 4.025E−04 | −1.300E−03 | 3.018E−03 | −1.136E−02 |
| 30th coefficient (P) | 9.134E−07 | −7.742E−06 | 3.003E−06 | 8.694E−06 | −2.532E−05 | 6.078E−05 | −1.510E−04 | 5.997E−04 |

|  | S9 | S10 | S11 | S12 | S13 | S14 | S15 | S16 |
|---|---|---|---|---|---|---|---|---|
| Conic constant (K) | −9.120 | −8.890 | −99.000 | −25.258 | 1.124 | −1.114 | −0.028 | −9.532 |
| 4th coefficient (A) | −4.552E−02 | −5.969E−02 | −6.151E−02 | −8.588E−02 | −6.004E−02 | −3.723E−02 | −1.412E−01 | −8.214E−02 |
| 6th coefficient (B) | 4.112E−02 | 1.273E−01 | 2.919E−02 | 6.123E−02 | 6.548E−03 | 1.165E−02 | 6.995E−02 | 4.074E−02 |
| 8th coefficient (C) | −1.818E−01 | −4.419E−01 | 4.086E−02 | −2.208E−02 | 1.787E−02 | −4.492E−03 | −2.601E−02 | −1.361E−02 |
| 10th coefficient (D) | 6.655E−01 | 1.060E+00 | −1.524E−01 | −3.612E−02 | −3.157E−02 | −3.394E−04 | 6.729E−03 | 3.052E−03 |
| 12th coefficient (E) | −1.712E+00 | −1.741E+00 | 2.314E−01 | 7.624E−02 | 2.853E−02 | 1.654E−03 | −1.195E−03 | −4.718E−04 |
| 14th coefficient (F) | 3.031E+00 | 1.998E+00 | −2.211E−01 | −7.431E−02 | −1.672E−02 | −1.120E−03 | 1.493E−04 | 5.151E−05 |
| 16th coefficient (G) | −3.745E+00 | −1.631E+00 | 1.444E−01 | 4.571E−02 | 6.722E−03 | 4.344E−04 | −1.341E−05 | −4.028E−06 |
| 18th coefficient (H) | 3.272E+00 | 9.580E−01 | −6.641E−02 | −1.909E−02 | −1.893E−03 | −1.103E−04 | 8.765E−07 | 2.264E−07 |
| 20th coefficient (J) | −2.032E+00 | −4.053E−01 | 2.176E−02 | 5.546E−03 | 3.754E−04 | 1.904E−05 | −4.180E−08 | −9.054E−09 |
| 22nd coefficient (L) | 8.907E−01 | 1.222E−01 | −5.069E−03 | −1.121E−03 | −5.204E−05 | −2.251E−06 | 1.440E−09 | 2.512E−10 |
| 24th coefficient (M) | −2.693E−01 | −2.560E−02 | 8.259E−04 | 1.545E−04 | 4.927E−06 | 1.794E−07 | −3.487E−11 | −4.594E−12 |
| 26th coefficient (N) | 5.345E−02 | 3.535E−03 | −9.036E−05 | −1.386E−05 | −3.032E−07 | −9.212E−09 | 5.636E−13 | 4.979E−14 |
| 28th coefficient (O) | −6.263E−03 | −2.889E−04 | 6.037E−06 | 7.280E−07 | 1.093E−08 | 2.752E−10 | −5.459E−15 | −2.438E−16 |
| 30th coefficient (P) | 3.285E−04 | 1.057E−05 | −1.882E−07 | −1.701E−08 | −1.750E−10 | −3.635E−12 | 2.396E−17 | 2.995E−20 |

Figure 18:
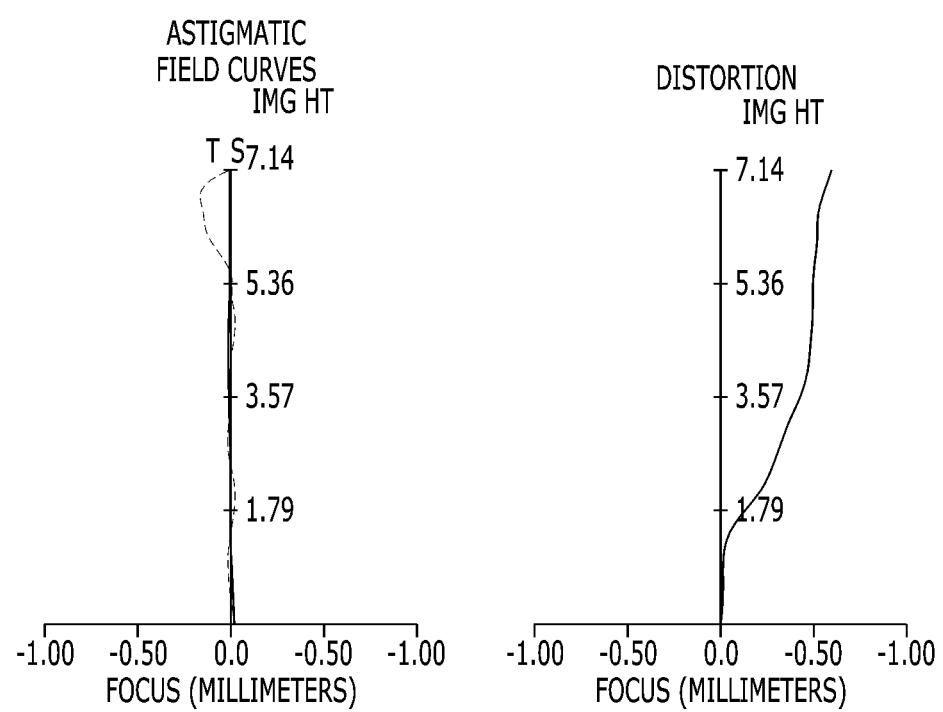
FIG. 18 is curves indicating aberration properties of the optical imaging system illustrated in FIG. 17.

Also, the optical imaging system configured as described above may have the aberration characteristics illustrated in FIG. 18.

Figure 19:
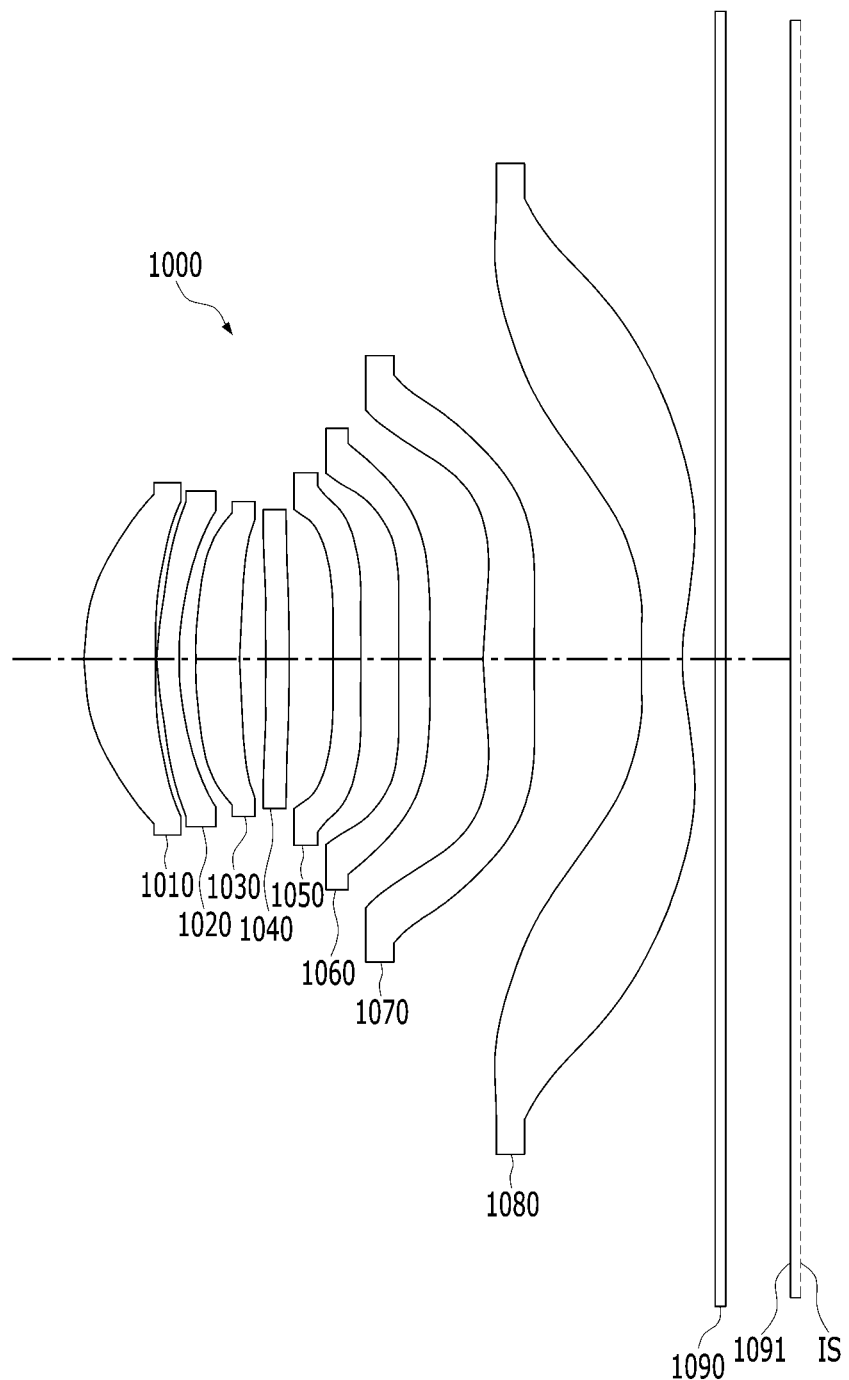
FIG. 19 is a diagram illustrating an optical imaging system according to a tenth example embodiment of the present disclosure.

An optical imaging system 1000 according to a tenth example embodiment will be described with reference to FIGS. 19 and 20.

The optical imaging system 1000 in the ninth example embodiment may include an optical system including a first lens 1010, a second lens 1020, a third lens 1030, a fourth lens 1040, and a fifth lens 1050, a sixth lens 1060, a seventh lens 1070, and an eighth lens 1080 and may further include a filter 1090 and an image sensor IS.

The optical imaging system 1000 in the seventh example embodiment may form a focus on the imaging plane 1091. The imaging plane 1091 may refer to a surface on which a focus may be formed by the optical imaging system. For example, the imaging plane 1091 may refer to one surface of the image sensor IS on which light is received.

The lens characteristics of each lens (a radius of curvature, a thickness of the lens or a distance between the lenses, a refractive index, an Abbe number, and a focal length) are listed in Table 19.

TABLE 19

| Surface No. | Note | Radius of curvature | Thickness or distance | Refractive index | Abbe number | Focal length |
|---|---|---|---|---|---|---|
| S1 | First lens | 2.572 | 0.784 | 1.544 | 56.0 | 7.1 |
| S2 |  | 6.812 | 0.025 |  |  |  |

TABLE 19-continued

| Surface No. | Note | Radius of curvature | Thickness or distance | Refractive index | Abbe number | Focal length |
|---|---|---|---|---|---|---|
| S3 | Second lens | 5.290 | 0.220 | 1.680 | 18.2 | −16.3 |
| S4 | | 3.535 | 0.188 | | | |
| S5 | Third lens | 5.385 | 0.516 | 1.535 | 55.7 | 18.2 |
| S6 | | 11.583 | 0.267 | | | |
| S7 | Fourth lens | 76.309 | 0.250 | 1.567 | 37.4 | 124.58 |
| S8 | | −1041.521 | 0.461 | | | |
| S9 | Fifth lens | 83.881 | 0.317 | 1.680 | 18.2 | −32.83 |
| S10 | | 17.793 | 0.445 | | | |
| S11 | Sixth lens | 16.668 | 0.340 | 1.635 | 24.0 | 2934.33 |
| S12 | | 16.683 | 0.600 | | | |
| S13 | Seventh lens | 4.783 | 0.551 | 1.567 | 37.4 | 13.81 |
| S14 | | 11.662 | 1.177 | | | |
| S15 | Eighth lens | 10.464 | 0.481 | 1.544 | 56.0 | −6.16 |
| S16 | | 2.504 | 0.337 | | | |
| S17 | Filter | Infinity | 0.110 | 1.517 | 64.2 | |
| S18 | | Infinity | 0.770 | | | |
| S19 | Imaging plane | Infinity | | | | |

The total focal length f of the optical imaging system 1000 in the tenth example embodiment may be 7.24 mm, MG HT may be 7.145 mm, FOV may be 87.2°, SAG52 may be −0.460 mm, SAG62 may be −0.904 mm, SAG72 may be −1.550 mm, and SAG82 may be −1.762 mm.

In the tenth example embodiment, the first lens 1010 may have positive refractive power, the first surface of the first lens 1010 may be convex, and the second surface of the first lens 1010 may be concave.

The second lens 1020 may have negative refractive power, a first surface of the second lens 1020 may be convex, and a second surface of the second lens 1020 may be concave.

The third lens 1030 may have positive refractive power, a first surface of the third lens 1030 may be convex, and a second surface of the third lens 1030 may be concave.

The fourth lens 1040 may have positive refractive power, the first and second surfaces of the fourth lens 1040 may be convex.

The fifth lens 1050 may have negative refractive power, the first surface of the fifth lens 1050 may be convex, and the second surface of the fifth lens 1050 may be concave.

The sixth lens 260 may have positive refractive power, the first surface of the sixth lens 260 may be convex, and the second surface of the sixth lens 260 may be concave.

Also, at least one inflection point may be formed on at least one of the first and second surfaces of the sixth lens 260. For example, the first surface of the sixth lens 260 may be convex in the paraxial region and may be concave in a portion other than the paraxial region. The second surface of the sixth lens 260 may be concave in the paraxial region and may be convex in a portion other than the paraxial region.

The seventh lens 270 may have positive refractive power, and the first surface of the seventh lens 270 may be convex, and the second surface of the seventh lens 270 may be concave.

Also, at least one inflection point may be formed on at least one of the first and second surfaces of the seventh lens 270. For example, the first surface of the seventh lens 270 may be convex in the paraxial region and may be concave in a portion other than the paraxial region. The second surface of the seventh lens 270 may be concave in the paraxial region and may be convex in a portion other than the paraxial region.

The eighth lens 280 may have negative refractive power, and the first surface of the eighth lens 180 may be convex in the paraxial region, and the second surface of the eighth lens 280 may be concave in the paraxial region.

Also, at least one inflection point may be formed on at least one of the first and second surfaces of the eighth lens 280. For example, the first surface of the eighth lens 280 may be convex in the paraxial region and may be concave in a portion other than the paraxial region. The second surface of the eighth lens 280 may be concave in the paraxial region and may be convex in a portion other than the paraxial region.

Each surface of the first lens 1010 to the eighth lens 1080 may have an aspherical coefficient as in Table 20. For example, both the object-side surface and the image-side surface of the first lens 1010 to the eighth lens 1080 may be aspherical.

TABLE 20

| | S1 | S2 | S3 | S4 | S5 | S6 | S7 | S8 |
|---|---|---|---|---|---|---|---|---|
| Conic constant (K) | −1.390 | 10.550 | −10.251 | −4.372 | 0.395 | −9.947 | −98.568 | 99.000 |
| 4th coefficient (A) | 7.335E−03 | −5.012E−03 | −2.603E−03 | −3.761E−03 | −9.013E−03 | −1.748E−02 | −1.374E−02 | −2.254E−02 |
| 6th coefficient (B) | 5.061E−03 | 1.771E−02 | 3.239E−02 | 3.364E−02 | 3.613E−02 | 8.713E−02 | −6.288E−02 | 5.776E−02 |

TABLE 20-continued

| | | | | | | | | |
|---|---|---|---|---|---|---|---|---|
| 8th coefficient (C) | −1.224E−02 | −3.259E−02 | −8.758E−02 | −1.195E−01 | −1.281E−01 | −4.156E−01 | 3.488E−01 | −3.103E−01 |
| 10th coefficient (D) | 2.714E−02 | 7.002E−02 | 2.231E−01 | 3.332E−01 | 3.204E−01 | 1.254E+00 | −1.150E+00 | 1.049E+00 |
| 12th coefficient (E) | −4.819E−02 | −1.942E−01 | −4.808E−01 | −6.615E−01 | −5.185E−01 | −2.522E+00 | 2.539E+00 | −2.291E+00 |
| 14th coefficient (F) | 6.113E−02 | 3.513E−01 | 7.204E−01 | 9.098E−01 | 5.478E−01 | 3.553E+00 | −3.906E+00 | 3.439E+00 |
| 16th coefficient (G) | −5.435E−02 | −3.955E−01 | −7.304E−01 | −8.736E−01 | −3.643E−01 | −3.600E+00 | 4.301E+00 | −3.676E+00 |
| 18th coefficient (H) | 3.414E−02 | 2.935E−01 | 5.110E−01 | 5.922E−01 | 1.279E−01 | 2.656E+00 | −3.436E+00 | 2.851E+00 |
| 20th coefficient (J) | −1.523E−02 | −1.489E−01 | −2.502E−01 | −2.843E−01 | 5.213E−03 | −1.428E+00 | 1.997E+00 | −1.612E+00 |
| 22nd coefficient (L) | 4.803E−03 | 5.214E−02 | 8.572E−02 | 9.575E−02 | −2.949E−02 | 5.533E−01 | −8.365E−01 | 6.600E−01 |
| 24th coefficient (M) | −1.047E−03 | −1.245E−02 | −2.017E−02 | −2.203E−02 | 1.506E−02 | −1.503E−01 | 2.460E−01 | −1.906E−01 |
| 26th coefficient (N) | 1.501E−04 | 1.938E−03 | 3.111E−03 | 3.283E−03 | −3.910E−03 | 2.713E−02 | −4.822E−02 | 3.691E−02 |
| 28th coefficient (O) | −1.274E−05 | −1.777E−04 | −2.833E−04 | −2.835E−04 | 5.409E−04 | −2.922E−03 | 5.657E−03 | −4.304E−03 |
| 30th coefficient (P) | 4.850E−07 | 7.288E−06 | 1.156E−05 | 1.066E−05 | −3.173E−05 | 1.420E−04 | −3.003E−04 | 2.287E−04 |

| | S9 | S10 | S11 | S12 | S13 | S14 | S15 | S16 |
|---|---|---|---|---|---|---|---|---|
| Conic constant (K) | 99.000 | 1.255 | −97.029 | −29.474 | 1.130 | −0.838 | −0.016 | −10.831 |
| 4th coefficient (A) | −5.052E−02 | −5.610E−02 | −6.227E−02 | −8.311E−02 | −6.392E−02 | −4.241E−02 | −1.304E−01 | −6.624E−02 |
| 6th coefficient (B) | 7.639E−02 | 1.068E−01 | 5.049E−02 | 6.226E−02 | 1.147E−02 | 1.720E−02 | 5.537E−02 | 2.741E−02 |
| 8th coefficient (C) | −3.391E−01 | −3.792E−01 | −3.971E−02 | −3.401E−02 | 9.115E−03 | −1.332E−02 | −1.814E−02 | −8.175E−03 |
| 10th coefficient (D) | 1.116E+00 | 9.310E−01 | 2.390E−02 | −9.904E−03 | −2.166E−02 | 8.466E−03 | 4.358E−03 | 1.732E−03 |
| 12th coefficient (E) | −2.595E+00 | −1.555E+00 | −2.405E−02 | 4.373E−02 | 2.136E−02 | −3.870E−03 | −7.407E−04 | −2.623E−04 |
| 14th coefficient (F) | 4.270E+00 | 1.805E+00 | 3.493E−02 | −4.832E−02 | −1.320E−02 | 1.218E−03 | 9.004E−05 | 2.866E−05 |
| 16th coefficient (G) | −5.021E+00 | −1.486E+00 | −3.776E−02 | 3.159E−02 | 5.521E−03 | −2.566E−04 | −7.955E−06 | −2.274E−06 |
| 18th coefficient (H) | 4.248E+00 | 8.775E−01 | 2.674E−02 | −1.375E−02 | −1.607E−03 | 3.434E−05 | 5.158E−07 | 1.310E−07 |
| 20th coefficient (J) | −2.587E+00 | −3.727E−01 | −1.255E−02 | 4.124E−03 | 3.283E−04 | −2.441E−06 | −2.454E−08 | −5.415E−09 |
| 22nd coefficient (L) | 1.122E+00 | 1.127E−01 | 3.946E−03 | −8.562E−04 | −4.674E−05 | −6.507E−09 | 8.463E−10 | 1.566E−10 |
| 24th coefficient (M) | −3.377E−01 | −2.365E−02 | −8.204E−04 | 1.208E−04 | 4.536E−06 | 1.832E−08 | −2.059E−11 | −3.022E−12 |

TABLE 20-continued

| | | | | | | | | |
|---|---|---|---|---|---|---|---|---|
| 26th coefficient (N) | 6.702E−02 | 3.269E−03 | 1.079E−04 | −1.106E−05 | −2.856E−07 | −1.660E−09 | 3.349E−13 | 3.543E−14 |
| 28th coefficient (O) | −7.881E−03 | −2.674E−04 | −8.115E−06 | 5.917E−07 | 1.051E−08 | 6.706E−11 | −3.269E−15 | −2.044E−16 |
| 30th coefficient (P) | 4.158E−04 | 9.789E−06 | 2.645E−07 | −1.405E−08 | −1.717E−10 | −1.078E−12 | 1.447E−17 | 2.552E−19 |

Figure 20:
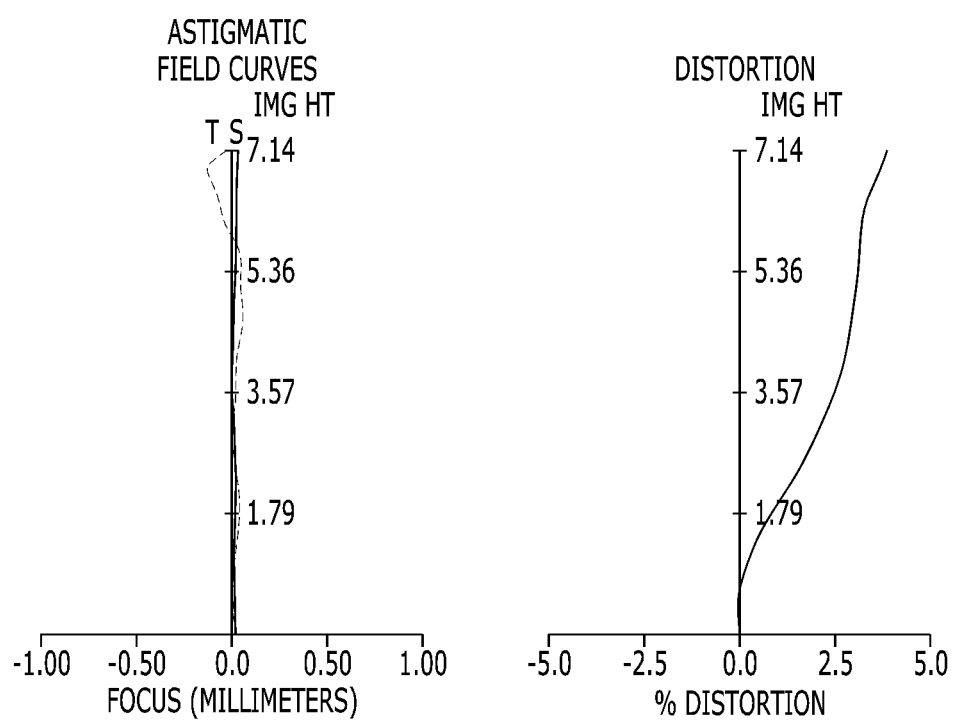
FIG. 20 is curves indicating aberration properties of the optical imaging system illustrated in FIG. 19.

Also, the optical imaging system configured as described above may have the aberration characteristics illustrated in FIG. 20.

According to the aforementioned example embodiments, the optical imaging system may have a reduced size while implementing high resolution.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical imaging system, comprising:
a first lens, a second lens, a third lens, a fourth lens, a fifth lens, a sixth lens, a seventh lens, and an eighth lens disposed in order from an object side,
wherein the first lens has positive refractive power, the second lens has negative refractive power, the third lens has positive refractive power, and the fourth lens positive refractive power,
at least three of the first to eighth lenses each has a refractive index of 1.61 or more,
(TTL/(2×IMG HT))×(TTL/f)<0.64 is satisfied, where TTL is a distance from an object-side surface of the first lens to an imaging plane on an optical axis, IMG HT is half a diagonal length of the imaging plane, and f is a total focal length of the first lens to the eighth lens, and
15<v1−v4<40 is satisfied, where v1 is a first Abbe Number of the first lens, and v4 is a fourth Abbe Number of the fourth lens.

2. The optical imaging system of claim 1,
wherein the second lens has a refractive index of 1.61 or more, and
wherein, among the at least three lenses having a refractive index of 1.61 or more, an absolute value of a focal length of the second lens is the smallest.

3. The optical imaging system of claim 1,
wherein either one or both of 25<v1−v2<40, and 15<v1−(v6+v7)/2<30 are satisfied, where v2 is a second Abbe Number of the second lens, v6 is a sixth Abbe Number of the sixth lens, and v7 is a seventh Abbe Number of the seventh lens.

4. The optical imaging system of claim 1, wherein 0<f1/f<1.4 is satisfied, where f1 is a focal length of the first lens.

5. The optical imaging system of claim 1, wherein −3<f2/f<0 is satisfied, where f2 is a focal length of the second lens.

6. The optical imaging system of claim 1, wherein 1<f3/f<6 is satisfied, where f3 is a focal length of the third lens.

7. The optical imaging system of claim 1, wherein 0<f7/(10×f)<5 is satisfied, where f7 is a focal length of the seventh lens.

8. The optical imaging system of claim 1, wherein −3<f8/f<0 is satisfied, where f8 is a focal length of the eighth lens.

9. The optical imaging system of claim 1,
wherein BFL/f<0.3 is satisfied,
where BFL is a distance from an image-side surface of the eighth lens to the imaging plane on the optical axis.

10. The optical imaging system of claim 1, wherein 70°<FOV×(IMG HT/f)<100° is satisfied, where FOV is a field of view of the optical imaging system.

11. The optical imaging system of claim 1, wherein −0.2<SAG52/TTL<0 is satisfied, where SAG52 is an SAG value on an end of an effective diameter of an image-side surface of the fifth lens.

12. The optical imaging system of claim 1, wherein −0.2<SAG62/TTL<0 is satisfied, where SAG62 is an SAG value on an end of an effective diameter of an image-side surface of the sixth lens.

13. The optical imaging system of claim 1, wherein −0.3<SAG72/TTL<0 is satisfied, where SAG72 is an SAG value on an end of an effective diameter of an image-side surface of the seventh lens.

14. The optical imaging system of claim 1, wherein −0.3<SAG82/TTL<0 is satisfied, where SAG82 is an SAG value on an end of an effective diameter of an image-side surface of the eighth lens.

15. The optical imaging system of claim 1,
wherein either one or both of 5<|Y72/Z72|<100 and 5<|Y82/Z82|<30 are satisfied, where Y72 is a vertical height between the optical axis and a first inflection point of an image-side surface of the seventh lens, Y82 is a vertical height between the optical axis and a first inflection point of an image-side surface of the eighth lens, Z72 is an Sag value at a first inflection point of an image-side surface of the seventh lens, and Z82 is an Sag value at a first inflection point of an image-side surface of the eighth lens.

16. The optical imaging system of claim 1, wherein the fifth lens has negative refractive power, the seventh lens has positive refractive power, and the eighth lens has negative refractive power.

* * * * *